(12) United States Patent
Ohki

(10) Patent No.: US 7,659,931 B2
(45) Date of Patent: Feb. 9, 2010

(54) APPARATUS FOR IMAGING OBJECTS OF CHANGING LUMINANCE

(75) Inventor: Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 785 days.

(21) Appl. No.: 10/619,100

(22) Filed: Jul. 14, 2003

(65) Prior Publication Data

US 2004/0012687 A1    Jan. 22, 2004

(30) Foreign Application Priority Data

Jul. 16, 2002   (JP)   ............................ P2002-206380

(51) Int. Cl.
*H04N 3/14* (2006.01)
*H04N 5/238* (2006.01)

(52) U.S. Cl. ...................... 348/297; 348/364
(58) Field of Classification Search .................. 348/297
See application file for complete search history.

(56) References Cited

U.S. PATENT DOCUMENTS

| | | | | |
|---|---|---|---|---|
| 5,872,596 | A * | 2/1999 | Yanai et al. | 348/297 |
| 6,529,241 | B1 * | 3/2003 | Clark | 348/308 |
| 6,580,454 | B1 * | 6/2003 | Perner et al. | 348/302 |
| 6,987,536 | B2 * | 1/2006 | Olding et al. | 348/297 |
| 7,038,820 | B1 * | 5/2006 | Kindt et al. | 358/474 |
| 7,088,395 | B2 * | 8/2006 | Takayama et al. | 348/297 |

FOREIGN PATENT DOCUMENTS

| | | |
|---|---|---|
| JP | 61-214562 | 9/1986 |
| JP | 05-244411 | 9/1993 |
| JP | 06-197286 | 7/1994 |
| JP | 07-067042 | 3/1995 |
| JP | 2000-299821 | 10/2000 |
| JP | 2001-008101 | 1/2001 |
| JP | 2001-054022 | 2/2001 |
| JP | 2002-033962 | 1/2002 |

OTHER PUBLICATIONS

Office Action dated Apr. 24, 2008, issued from the Japanese Patent Office in counterpart Japanese Patent Application No. 2002-206380.

* cited by examiner

*Primary Examiner*—Justin P Misleh
(74) *Attorney, Agent, or Firm*—Finnegan, Henderson, Farabow, Garrett and Dunner, L.L.P.

(57) ABSTRACT

In an imaging apparatus, a function whose value increases in time is used as a threshold electric-signal level, and an electric-signal level of a photoreceptor element is compared with the threshold electric-signal level. Even if a light received by the photoreceptor element has a low luminance, the electric-signal level of the photoreceptor element crosses the threshold electric-signal level in a short time, allowing calculation of the amount of optical energy received by the photoreceptor element. Furthermore, when an object having a region where brightness changes in time and also having a region with a low luminance is imaged, imaging interval is changed in accordance with luminance. Accordingly, information regarding how the brightness of the object is rapidly changing in time can be obtained more precisely, and an image can be output without making a projection image of the dark region completely black.

6 Claims, 11 Drawing Sheets

FIG. 9

| AND CIRCUIT \ COUNTER VALUE | 0 | 1 | 2 | 3 | 4 | 5 | .. |
|---|---|---|---|---|---|---|---|
| 702-0 | T | F | F | F | F | F | |
| 702-1 | F | T | F | F | F | F | |
| 702-2 | F | F | T | F | F | F | .. |
| 702-3 | F | F | F | T | F | F | |
| 702-4 | F | F | F | F | T | F | |
| 702-5 | F | F | F | F | F | T | |
| .. | .. | | | | | | |

APPARATUS FOR IMAGING OBJECTS OF CHANGING LUMINANCE

BACKGROUND OF THE INVENTION

1. Field of the Invention

The present invention relates to imaging apparatuses. More specifically, the present invention relates to an imaging apparatus with which a picture of an improved quality can be taken of an object having both a bright region and a dark region, i.e., a high-luminance region and a low-luminance region, and that allows precise analysis of change in the luminance of a picture taken of an object whose luminance changes.

2. Description of the Related Art

Recently, digital cameras are becoming common. In a digital camera, image signals captured are digitized, and the digitized signals can be transferred to an information processing apparatus such as a personal computer (PC) via a recording medium such as a flash memory, via a cable, or by infrared communication. The personal computer, having received the data, is allowed to display a corresponding image on a monitor such as a CRT display or a liquid crystal display.

A picture taken by an imaging apparatus is composed of data of a plurality of pixels. For example, in a video camera, a picture is formed based on lights received respectively by 720×480 photoreceptor elements corresponding to an array of 720 horizontal and 480 vertical pixels. In the case of a still camera, the number of pixels is, for example, on the order of several hundred thousands to several millions. The pixels correspond one by one to the photoreceptor elements in the imaging apparatus. The value of data for each pixel (pixel value) is proportional to the amount of optical energy that is incident on the corresponding photoreceptor element during an exposure time. That is, the pixel value of each pixel is proportional to the amount of optical energy that is incident per unit time.

When eight bits are assigned to each pixel, the pixel value of each pixel takes on one of 256 values ranging from 0 to 255. 0 represents the minimum luminance, indicating a dark region for which no optical energy is received by an associated photoreceptor element. On the other hand, 256 represents the maximum luminance, indicating a most bright region. A pixel value of 2 indicates that the pixel receives twice as much optical energy per unit time as a pixel with a pixel value of 1.

As described earlier, a video camera typically has 720×480 pixels, and a still camera typically has several hundred thousand to several million pixels. When an image is taken, exposure time is common among the large number of photoreceptor elements corresponding to all the pixels.

For example, if an exposure time for a photoreceptor element corresponding to a certain pixel of an image A is a period from time T1 to time T2, imaging time is the period from time T1 to time T2 for all the pixels constituting the image A. The length of the period (T2−T1) is usually on the order of ⅟30 to ⅟1,000 seconds. The period (T2−T1) is referred to as an "imaging interval" for capturing the image A.

For example, a motion picture is captured by generating one image, i.e., one frame, at a cycle on the order of ⅟30 to ⅟1,000 seconds and successively capturing a plurality of frames. Each frame consists of a single image, and a frame image is formed by exposing all the pixels from a particular time for a particular time interval (exposure time).

As described above, in a conventional imaging apparatus, imaging is carried out by exposing all the pixels for the same exposure time. This has raised various unfavorable restrictions, which will be described below.

For example, a problem arises when an object having both a bright region and a dark region is imaged by an imaging apparatus such as a video camera or a still camera. If the exposure time of the imaging apparatus is set to be short in order to avoid an overflow of optical energy received by a photoreceptor element on which a high-luminance region of the object is projected, sufficient optical energy is not received by a photoreceptor element on which a low-luminance region is projected, so that the projection image of the low-luminance region becomes completely black.

On the other hand, if the exposure time is set to be long so that sufficient optical energy will be received by a photoreceptor element on which a dark region of the object is projected, excessive optical energy is received by a photoreceptor element on which a bright region of the object is projected, so that the projection image of the bright region becomes completely white. That is, it has been inhibited to avoid an overflow in a projection image of a bright region while preventing a projection image of a dark region from becoming completely black. This problem will be referred to as a "first shortcoming of the related art".

Furthermore, another problem will be described below, which will be referred to as a "second shortcoming of the related art". This problem arises, for example, when an object whose brightness is changing rapidly in time over a dark background is successively imaged. In order to analyze how the brightness of the object is rapidly changing in time based on a plurality of image frames captured, successive imaging with a short exposure time is required.

If successive imaging is carried out with a short exposure time, however, exposure time for each one of the images is short. Thus, sufficient optical energy is not received by a photoreceptor element associated with the dark background, resulting in a completely black projection image, so that a favorable image of the dark region cannot be obtained.

On the other hand, if successive imaging is carried out with a long exposure time so that sufficient optical energy will be received by a photoreceptor element on which a region of the dark background is projected, the time interval of each image frame becomes long, inhibiting precise analysis of the rapid change in the luminance of the object. As described above, when successive images of an object having both a bright region and a dark region are taken for analyzing change in the luminance of the bright region, it is not possible to obtain clear images for both the bright region and the dark region. This problem will be referred to as a "second shortcoming of the related art".

Imaging apparatuses that overcome the "first shortcoming of the related art" have been proposed, for example, in "David Stoppa et al., "A 138 dB Dynamic Range CMOS Image Sensor with New Pixel Architecture", IEEE International Solid-State Circuits Conference Digest of Technical Papers, pp. 40-41, 2002", Japanese Unexamined Patent Application Publication No. 2001-326857, entitled as "Enzan kinou tsuki satsuzou soshi", which could be translated as "Imaging device capable of calculation", and "YOSHIMURA Shinichi, "CMOS imeeji sensaa no kougashitsuka to apurikeeshon", Technical Report of IEICE, ICD 2001-97", which could be translated as "Improvement in picture quality of CMOS image sensor, and applications thereof".

Features of imaging apparatuses disclosed in these documents will be described below. Initially, an electric signal of an initial-setting electric-signal level (Vinit) (e.g., an initial potential) is set to each photoreceptor element in an imaging apparatus.

Then, exposure starts by imaging. During the exposure, the electric signal set to each photoreceptor element flows out and tends to zero. This is because when an optical energy is received by a photoreceptor element, an amount of electric signal in proportion to the amount of optical energy flows out from the photoreceptor element. The rate of the electric signal tending to zero is proportional to the amount of energy that is incident on the photoreceptor element.

The level of the electric signal, being attenuated as time passes, is compared by a comparator with a predetermined threshold value (Vth). Then, a time (Tc) when the electric-signal level of each photoreceptor element becomes lower than the threshold value (Vth) is recorded. For each photoreceptor element, a value (Vinit−Vth)/Tc is calculated using the time Tc, whereby the amount of optical energy that is incident on the photoreceptor element per unit time is known.

As described above, optical energy received by each photoreceptor element corresponding to a pixel is measured, and an appropriate time for receiving optical energy is set for each photoreceptor element, avoiding reception of excessive or insufficient optical energy. Accordingly, the imaging apparatus allows imaging over a wide dynamic range. Accordingly, an overflow is less likely to occur, so that a projection image of a dark region is prevented from becoming completely black without causing an overflow. This arrangement overcomes the "first shortcoming of the related art", described earlier.

Even in the arrangement described above, however, with regard to a photoreceptor element for which the amount of optical energy that is incident thereon per unit time is extremely small, the electric signal thereof is hard to be attenuated, so that a problem arises that it takes a considerable length of time before the electric-signal level becomes lower than Vth. This problem will be referred to as a "third shortcoming of the related art".

Furthermore, even in the improved imaging apparatuses, after a time when the electric-signal level becomes lower than Vth has been recorded, each photoreceptor element stays idle doing nothing until recording of a time for a photoreceptor element associated with the darkest region is executed. That is, in the imaging apparatuses, imaging interval is the same for all the pixels. Thus, the "second shortcoming of the related art" is not overcome yet.

SUMMARY OF THE INVENTION

The present invention has been made in view of the situation described above, and an object thereof is to provide an imaging apparatus that allows an object having both a bright region with a high luminance and a dark region with a low luminance region, or an object whose luminance is changing, to be imaged clearly with regard to both a region with a high luminance and a region with a low luminance.

Another object of the present invention is to provide an imaging apparatus that serves to obtain more precise information regarding change in luminance when an object having a region where luminance is changing and a region with a low luminance is imaged to obtain information regarding change in the luminance of the luminance-changing region.

The present invention, in a first aspect thereof, provides an imaging apparatus including a photoreceptor element that changes an electric-signal level on an output line thereof in accordance with an intensity of light received; a comparing unit for comparing the electric-signal level on the output line of the photoreceptor element with a threshold electric-signal level, and sending an output signal on condition that the electric-signal level on the output line of the photoreceptor element has crossed the threshold electric-signal level; and a storage unit, to which a clock signal is input, for recording information regarding a time of generation of the output signal from the comparing unit; wherein the threshold electric-signal level changes as time elapses.

Preferably, the photoreceptor element is set to an initial-setting electric-signal level by an initialize signal and the electric-signal level on the output line is lowered in accordance with the intensity of light received, wherein the comparing unit outputs an output signal on condition that the electric-signal level on the output line of the photoreceptor element has become lower than or equal to the threshold electric-signal level, and wherein the threshold electric-signal level becomes higher as time elapses.

The imaging apparatus may further include a calculation unit, wherein the storage unit records time information regarding a time taken for the electric-signal level on the output line to be lowered by an exposure of the photoreceptor element from an initial-setting electric-signal level until crossing the threshold electric-signal level, and wherein the calculation unit receives input of the time information recorded in the storage unit, calculates a value of optical energy received by the photoreceptor element per unit time according to a formula (Vinit−Vth(t))/Tn where Vinit denotes the initial-setting electric-signal level, Vth(t) denotes the threshold electric-signal level, and Tn denotes the time information, and calculates a pixel value based on the value of optical energy received.

The comparing unit may compare an amplified electric-signal level of the electric-signal level on the output line of the photoreceptor element with the threshold electric-signal level.

The present invention, in a second aspect thereof, provides an imaging apparatus including a photoreceptor element that changes an electric-signal level on an output line thereof in accordance with an intensity of light received; a comparing unit for comparing the electric-signal level on the output line of the photoreceptor element with a threshold electric-signal level, and sending an output signal on condition that the electric-signal level on the output line of the photoreceptor element has crossed the threshold electric-signal level; a storage unit, to which a clock signal is input, for recording information regarding a time of generation of the output signal from the comparing unit; and a reset-signal input unit for inputting a reset signal to the photoreceptor element based on the output signal from the comparing unit to reset the electric-signal level on the output line to the initial-setting electric-signal level.

Preferably, the storage unit repeatedly records time information and the reset-signal input unit repeatedly inputs a reset signal to the photoreceptor element, and wherein the storage unit successively records time information regarding times of generation of a plurality of output signals generated intermittently from the comparing unit.

The imaging apparatus may further include a calculation unit, wherein the storage unit successively records sets of time information regarding times taken for the electric-signal level on the output line to be lowered by an exposure of the photoreceptor element from an initial-setting electric-signal level until crossing the threshold electric-signal level, and wherein the calculation unit receives input of two successive sets of time information recorded in the storage unit, calculates a value of optical energy received by the photoreceptor element per unit time according to a formula (Vinit−Vth)/(Tx−Ty) where Vinit denotes the initial-setting electric-signal level, Vth denotes the threshold electric-signal level, and Tx and Ty denote the two successive sets of time information, respectively, and calculates a pixel value based on the value of optical energy received.

The threshold electric-signal level preferably changes as time elapses.

The comparing unit may compare an amplified electric-signal level of the electric-signal level on the output line of the photoreceptor element with the threshold electric-signal level.

The present invention, in a third aspect thereof, provides an imaging apparatus including a photoreceptor element that changes an electric-signal level on an output line thereof in accordance with an intensity of light received; a comparing unit for comparing the electric-signal level on the output line of the photoreceptor element with a threshold electric-signal level, and sending an output signal on condition that the electric-signal level on the output line of the photoreceptor element has crossed the threshold electric-signal level; a first storage unit, to which a clock signal is input, for recording information regarding a time of generation of the output signal from the comparing unit; and a second storage unit for successively recording the electric-signal level on the output line of the photoreceptor element and holding an electric-signal level recorded at the time of generation of the output signal from the comparing unit.

The imaging apparatus may further include a reset-signal input unit for inputting a reset signal to the photoreceptor element based on the output signal from the comparing unit to reset the electric-signal level on the output line to the initial-setting electric-signal level.

Preferably, the first storage unit repeatedly records time information, the second storage unit repeatedly records an electric-signal level, and the reset-signal input unit repeatedly inputs a reset signal to the photoreceptor element, wherein the first storage unit successively stores time information regarding respective times of generation of a plurality of output signals generated intermittently from the comparing unit, and wherein the second storage unit holds individual electric-signal levels recorded at the respective times of generation of the plurality of output signals intermittently generated from the comparing unit.

The imaging apparatus may also include a calculation unit, wherein the first storage unit successively records sets of time information regarding times taken for the electric-signal level on the output line to be lowered by an exposure of the photoreceptor element from an initial-setting electric-signal level until crossing the threshold electric-signal level, and wherein the calculation unit receives input of two successive sets of time information recorded in the first storage unit, and input of an electric-signal level associated with one of the two successive sets of time information, recorded in the second storage unit, calculates a value of optical energy received by the photoreceptor element per unit time according to a formula $(Vinit-Vx)/(Tx-Ty)$ where Vinit denotes the initial-setting electric-signal level, Vx denotes the electric-signal level associated with the one of the two successive sets of time information, and Tx and Ty denote the one and the other of the two successive sets of time information, respectively, and calculates a pixel value based on the value of optical energy received.

The threshold electric-signal level preferably changes as time elapses.

The second storage unit is, for example, an analog memory for storing an analog value, and stores the electric-signal level on the output line as an analog value.

Preferably, the second storage unit has a plurality of data recording regions, and holds individual electric-signal levels recorded at the respective times of generation of the plurality of output signals intermittently generated from the comparing unit.

The comparing unit may compare an amplified electric-signal level of the electric-signal level on the output line of the photoreceptor element with the threshold electric-signal level.

In an arrangement according to the present invention, the electric-signal level of a photoreceptor element is compared with a threshold electric-signal level represented by a function whose value increases in accordance with time. In the related art, measurement of the amount of optical energy received by a photoreceptor element associated with a low-luminance region has been substantially inhibited because the electric-signal level thereof does not become lower than or equal to a threshold value within a maximum imaging time. In contrast, according to the arrangement, the electric-signal level of a photoreceptor element associated with a low-luminance region crosses a threshold value in a shorter time. Accordingly, the amount of energy received by the photoreceptor element per unit time can be calculated, and a pixel value of a pixel associated with the photoreceptor element can be calculated accordingly, serving to improve picture quality.

Thus, when an object having both a high-luminance region and a low-luminance region is imaged, pixel values of all the pixels are calculated with high precision, serving to obtain a clear image. Furthermore, as compared with the related art, in which a constant threshold value is used, the electric-signal level of a photoreceptor element associated with a low-luminance region becomes lower than or equal to a threshold value in a shorter time. Accordingly, the amount of optical energy received by a photoreceptor element receiving very little optical energy per unit time can be measured and a corresponding pixel value can be calculated.

In another arrangement according to the present invention, imaging interval is varied in accordance with luminance when imaging an object having both a region where luminance is relatively high and is changing and a region with a low luminance. Accordingly, information regarding how the brightness is rapidly changing in the bright region can be obtained more precisely while preventing a projection image of the dark region from becoming completely black.

Furthermore, a photoreceptor element on which a bright region is projected is reset each time the electric-signal level thereof reaches a threshold level, and the length of each period is measured. Accordingly, even if a region with a high luminance is projected on a photoreceptor element, the pixel value of an associated pixel can be obtained precisely without causing an overflow.

In another arrangement according to the present invention, the electric-signal level of a photoreceptor element at a time when the electric-signal level has become lower than or equal to the threshold electric-signal level is recorded precisely, and the amount of optical energy received by the photoreceptor element per unit time is calculated based on the value recorded. Accordingly, the pixel value of each photoreceptor element is calculated more precisely.

Other objects, features, and advantages of the present invention will become apparent from the following description of embodiments of the present invention with reference to the accompanying drawings.

BRIEF DESCRIPTION OF THE DRAWINGS

FIG. 9 is a diagram showing output conditions of AND gates in the imaging apparatus according to the third embodiment;

DESCRIPTION OF THE PREFERRED EMBODIMENTS

Figure 1A:
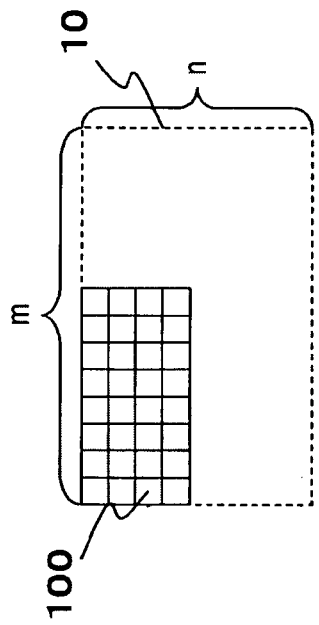
FIGS. 1A and 1B are diagrams showing the configuration of a signal processing unit of an imaging apparatus according to a first embodiment of the present invention.

Now, imaging apparatuses according to embodiments of the present invention will be described with reference to the drawings. In the embodiments described below, the present invention is applied to the arrangement of the imaging apparatus described earlier in the related art section, in which an electric signal of a certain level is set to each photoreceptor element of the imaging apparatus as an initial-setting electric signal (Vinit) and an electric signal attenuated by exposure is compared with a threshold electric signal (Vth) by a comparator, thereby analyzing the amount of optical energy received by each photoreceptor element.

When an object having a bright region with a high luminance and a dark region with a low luminance, or an object whose luminance is changing is imaged, an imaging apparatus according to the present invention allows both the high-luminance region and the low-luminance region to be imaged clearly. Now, imaging apparatuses according to three embodiments of the present invention will be described.

In an imaging apparatus according to a first embodiment, an electric signal of each photoreceptor, attenuated by exposure, is compared by a comparator with a threshold electric signal having a variable level (Vth). According to this embodiment, the "first shortcoming of the related art" is overcome without raising the problem of the "third shortcoming of the related art", described in the related art section. That is, an object having both a high-luminance region and a low-luminance region can be imaged clearly without incurring a time loss.

In an imaging apparatus according to a second embodiment, a photoreceptor element on which a high-luminance region (bright region) is projected carries out imaging at a shorter interval compared with a photoreceptor element on which a low-luminance region (dark region) is projected. For example, a photoreceptor element on which a high-luminance region (bright region) is projected carries out imaging a plurality of times while a photoreceptor element on which a low-luminance region (dark region) is projected carries out imaging once. Accordingly, both the "first shortcoming of the related art" and the "second shortcoming of the related art" are overcome. That is, an object having both a high-luminance region and a low-luminance region can be imaged. Furthermore, in an arrangement in which an object having both a bright region and a dark region is successively imaged to analyze change in the luminance of the bright region, both the bright region and the dark region can be imaged clearly.

In the imaging apparatus according to the second embodiment, imaging interval differs among pixels, so that a notion of a frame of an image does not exist. Thus, imaging is carried out based on "imaging time intervals for individual pixels" instead of "imaging time interval for the entire image".

An imaging apparatus according to a third embodiment is a partial modification of the imaging apparatus according to the second embodiment. In the imaging apparatus according to the third embodiment, the amount of optical energy received by each photoreceptor element per unit time can be calculated precisely, serving to obtain precise pixel data.

Features of the embodiments, which will be described below in detail, may be implemented either independently or in combination. That is, an imaging apparatus having the features of the first to the third embodiments in combination can be implemented.

First Embodiment

Figure 1B:
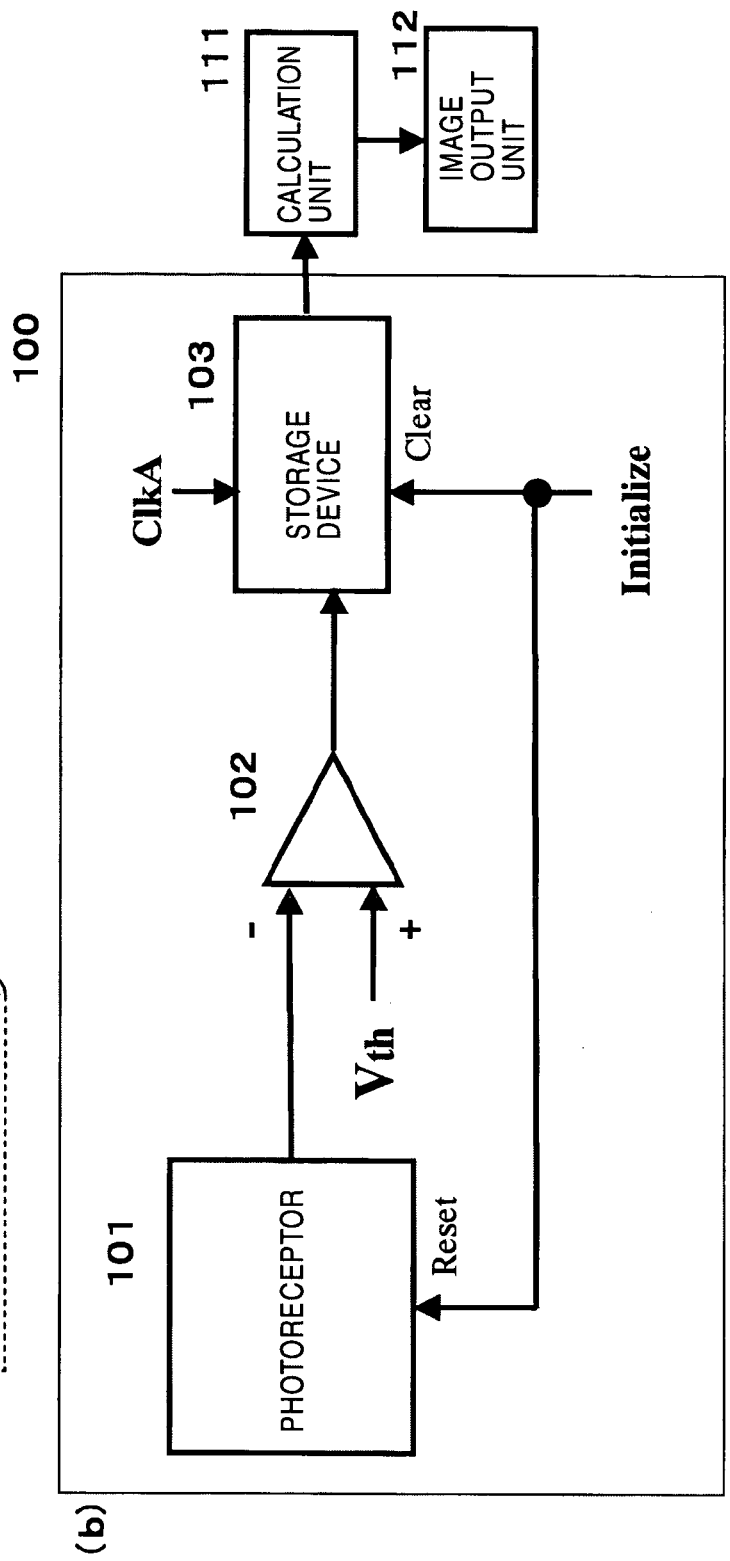

Now, a first embodiment of the present invention will be described. FIGS. 1A and 1B shows the circuit configuration of a signal processing circuit provided for each imaging element in an imaging apparatus according to the first embodiment of the present invention.

Referring to FIG. 1A, a photoreceptor unit 10 of the imaging apparatus includes m×n photoreceptor elements corresponding to an array of m horizontal pixels and n vertical pixels. FIG. 1B shows a signal processing unit 100 associated with one pixel. The imaging apparatus includes the same number of signal processing units like the one shown in FIG. 1B as the number of pixels m×n.

The signal processing unit 100 includes a photoreceptor element 101, a comparator 102, and a storage device 103. The signal processing unit 100 may additionally include, as required, an amplifier for amplifying an output of the photoreceptor element 101. The photoreceptor element 101 is, for example, a photodiode, and it generates, on an output line that is connected to the comparator 102, an electric signal in accordance with the amount of optical energy received during an exposure period.

The photoreceptor element 101 has a reset terminal (Reset). The photoreceptor element 101 is reset when an initialize signal (Initialize) that is externally supplied to the reset terminal thereof.

The photoreceptor element 101, upon resent, sets its output line connected to the comparator 102 at a desired non-zero level of electric signal, i.e., an initial-setting electric-signal level (Vinit). The initial-setting electric-signal level (Vinit) represents, for example, the voltage value of an initial potential. When imaging of an object, i.e., an exposure, is started, the photoreceptor element 101 receives light and outputs an electric signal in accordance with the amount of optical energy received, and the signal level on the output line connected to the comparator 102 is attenuated from the initial-setting electric-signal level (Vinit) in accordance with the amount of optical energy received.

The electric signal output from the photoreceptor element 101 is input to the comparator 102. To one input terminal of the comparator 102, a threshold electric signal (Vth) is input. The threshold electric signal (Vth) represents, for example, a voltage value of a threshold potential. As will be described later in more detail, in the imaging apparatus according to this embodiment, the value of the threshold electric signal (Vth) changes in time (t), and is thus denoted as Vth=Vth(t).

To the other input terminal of the comparator 102, the value of the electric signal output from the photoreceptor element 101 is input. The comparator 102 is constantly comparing the values input to these two input terminals, and it outputs an output signal to the storage device (digital memory) 103 when the level of the input electric signal transmitted via the output line from the photoreceptor element 101 becomes smaller than the level of the threshold electric signal (Vth).

The storage device (digital memory) 103 has a clear terminal (Clear). The content stored in the storage device (digital memory) 103 is deleted when an initialize signal (Initialize) that is externally supplied thereto is input to the clear terminal (Clear).

The storage device (digital memory) 103 records time in the form of digital data. More specifically, the storage device (digital memory) 103, after receiving a signal via the clear terminal (Clear) thereof, counts the number of clocks input via a clock A terminal (ClkA) thereof, and it records the number of clocks when the comparator 102 outputs an output signal for the first time. That is, the storage device 103 records information regarding time (Tn) elapsed until the signal level on the output line of the photoreceptor element 101 crosses the level of the threshold electric signal (Vth) by exposure of the photoreceptor element 101.

The number of clocks, recorded in the storage device (digital memory) 103, is output to a calculation unit 111. The calculation unit 111 receives input of the numbers of clocks for the respective pixels from the signal processing circuits associated with the m×n pixels constituting the photoreceptor unit 10, calculates luminance values based on the numbers of clocks. The luminance values calculated are fed to an image output unit 112 to display a corresponding image.

Figure 2:
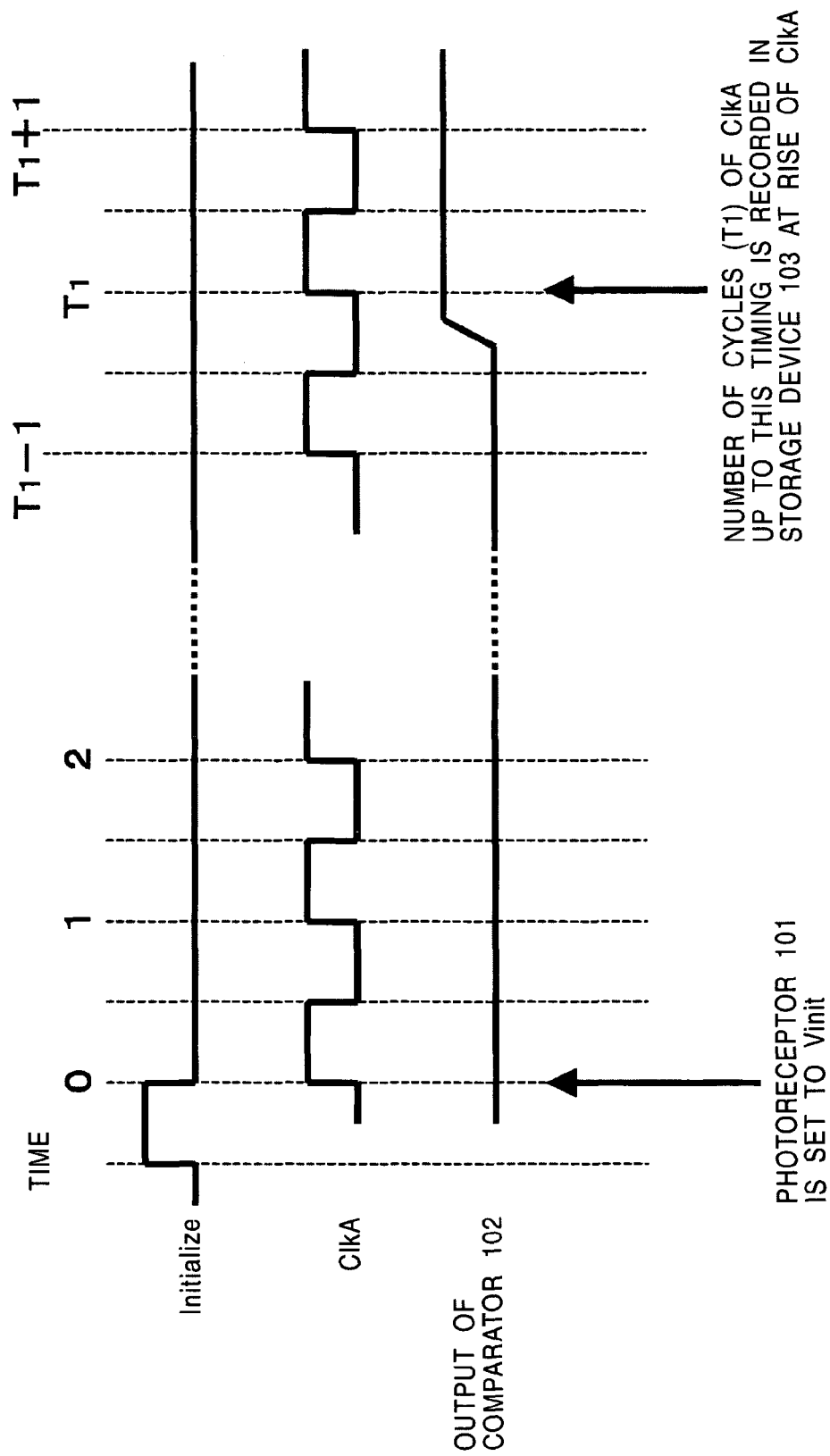
FIG. 2 is a timing chart showing signal transitions in the signal processing unit of the imaging apparatus according to the first embodiment.

The operation of the signal processing unit 100 shown in FIGS. 1A and 1B will be described with reference to a timing chart of signals in the signal processing unit 100, shown in FIG. 2. The timing chart in FIG. 2 shows, from top to bottom, the initialize signal (Initialize) input to the photoreceptor element 101 and the storage device 103, the clock signal input to the storage device 103, and the signal output from the comparator 102 to the storage device 103.

Timing of signals is controlled based on the clock signal (ClkA) input to the storage device 103. First, the initialize signal (Initialize) is input to the photoreceptor element 101 and the storage device 103 by a time 0 when an exposure is started.

When the photoreceptor element 101 receives light, the photoreceptor element 101 generates an electric signal, and the level of the electric signal is lowered. When the electric-signal level on the line connecting the photoreceptor element 101 and the comparator 102 becomes equal to the threshold electric-signal level (Vth), the comparator 102 outputs an output signal. In FIG. 2, the comparator 102 is outputting an output signal during a period from time T1-1 to time T1.

When the clock A (ClkA) rises immediately after the comparator 102 outputs an output signal, the number of clocks up to that time (i.e., a value T1) is recorded in the storage device (digital memory) 103. Once the time (T1) is recorded at time T1 in the storage device (digital memory) 103, the data stored is not updated by new time data unless it is cleared by an initialize signal (Initialize). The data recorded in the storage device (digital memory) 103 is output to the calculation unit 111, which calculates a luminance value (pixel value) in accordance with the number of clocks.

The clock rate of the clock A (ClkA) shown in FIG. 2, used for controlling timing of signal processing operations, is chosen so as to be sufficiently faster that change in the level of the electric signal of the photoreceptor element 101. Thus, change in the level of the electric signal of the photoreceptor element 101 can be associated with the number of clocks with a sufficient precision. That is, the number of clocks, recorded in the storage device 103 when the level of the electric signal input from the photoreceptor element 101 to the comparator 102 becomes equal to the threshold electric-signal level (Vth) and the comparator 102 outputs a signal, represents change in the level of the electric signal of the photoreceptor element 101, i.e., the amount of optical energy attributable to the exposure, with a good precision. Accordingly, the calculation unit 111 calculates luminance values (pixel values) in accordance with the recorded number of clocks with a good precision.

Now, description will be directed to how the level of the threshold electric signal changes in time, and to the counting of clocks in the storage device 103, which constitute features of this embodiment.

Figure 3:
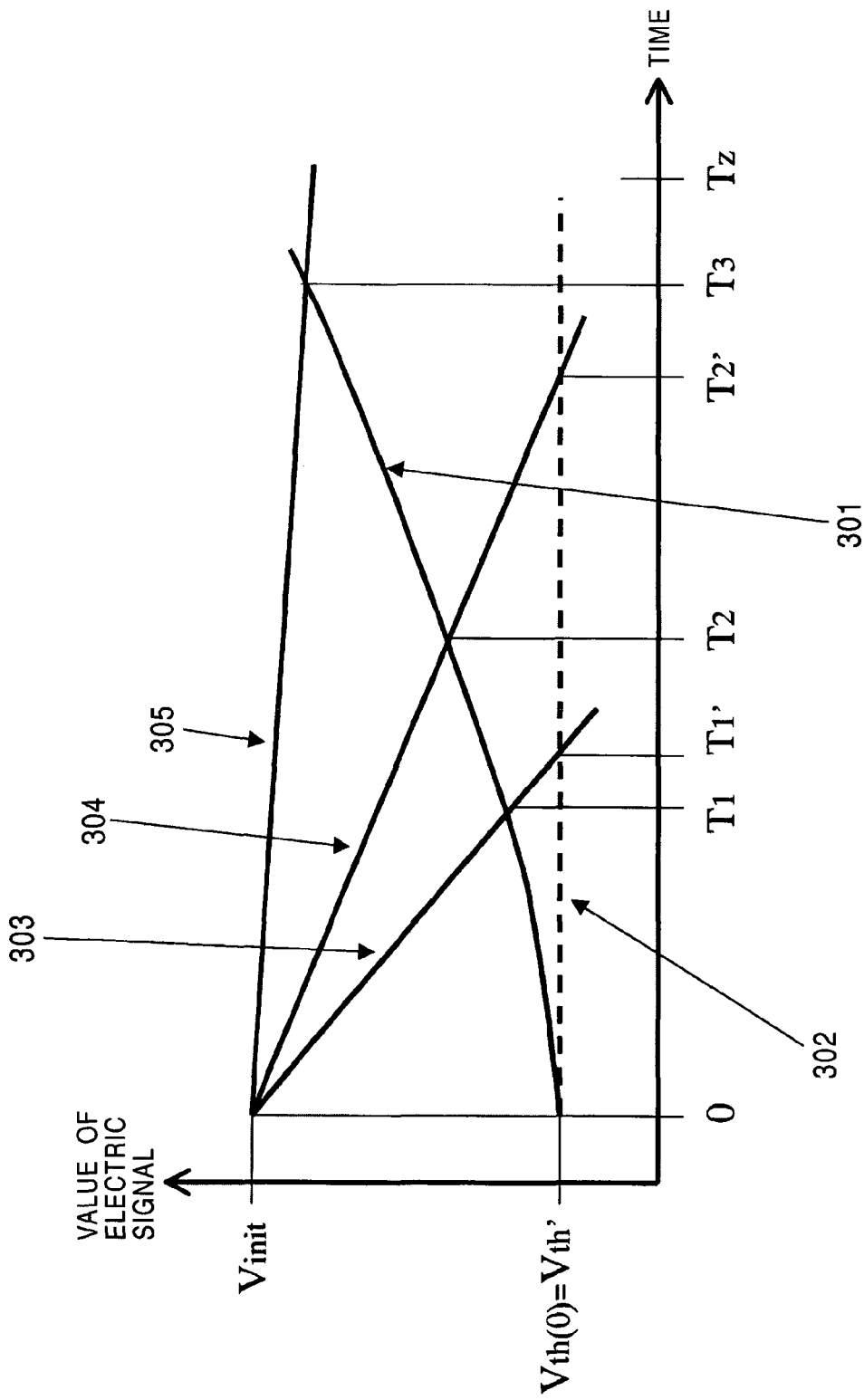
FIG. 3 is a timing chart showing macro signal transitions in the signal processing unit of the imaging apparatus according to the first embodiment.

FIG. 3 shows, with an X axis representing elapse of time (t), and a Y axis representing electric-signal level (e.g., voltage value), temporal changes 303 to 305 of the electric-signal levels of three photoreceptor elements receiving lights of three different luminance levels, a temporal change 301 of the level Vth(t) of the threshold electric signal input to the comparator 102 of the imaging apparatus according to this embodiment, and a constant level Vth' 302 of a threshold electric signal that is used in the related art.

The time intervals on the time axis shown in FIG. 3 are considerably longer than the time intervals on the time axis shown in FIG. 2. Thus, FIG. 3 shows the operation as continuous with respect to time. It can be considered that FIG. 2 shows the micro operation while FIG. 3 shows the macro operation.

In FIG. 3, a solid line 301 represents the level Vth(t) of the threshold electric signal input to the comparator 102 in the imaging apparatus according to this embodiment. Vth represented by the solid line 301 is a function whose value increases in accordance with time(t). Thus, letting a parameter representing time be denoted as t, in order to explicitly express that Vth is a function of t, the notation Vth(t) will be used. Vth(t) is known.

In FIG. 3, a dotted line 302 represents the level Vth' of the threshold electric signal that is used in the related art, that is, a threshold value that is constant and does not change in time. The notation Vth' is used in order to distinguish the level of the threshold electric signal in the related art from the level Vth(t) of the threshold electric signal in this embodiment. Vth' is constant and Vth'=Vth(0).

As described earlier with reference to FIG. 2, at t=0, an electric signal having a particular initial-setting electric-signal level (Vinit) is set to each photoreceptor element.

Exposure of each photoreceptor element starts at t=0. Now, three photoreceptor elements (a first photoreceptor element, a second photoreceptor element, and a third photoreceptor element) will be considered. On the first photoreceptor element, a bright region (high-luminance region) of an object to be imaged is projected. On the second photoreceptor element, a region of the object having an intermediate brightness (intermediate-luminance region) is projected. On the third photoreceptor element, a very dark region (low-luminance region) of the object is projected.

Thus, the levels of the electric signals of the photoreceptor elements change in time. More specifically, referring to FIG. 3, the electric-signal level of the first photoreceptor element (photoreceptor element associated with the high-luminance region) changes as indicated by the line 303, the electric-signal level of the second photoreceptor element (photoreceptor element associated with the intermediate-luminance region) changes as indicated by the line 304, and the electric-signal level of the third photoreceptor element (photoreceptor element associated with the low-luminance region) changes as indicated by the line 305. The electric-signal level of the first photoreceptor element tends to zero rather sharply since optical energy that is incident thereon per unit time is large (as indicated by the line 303 in FIG. 3). The electric-signal level of the second photoreceptor element tends to zero rather gradually (as indicated by the line 304 in FIG. 3). The electric-signal level of the third photoreceptor element is lowered very gradually since little optical energy is incident thereon (as indicated by the line 305 in FIG. 3).

Now, the operation in the related art will be briefly described. The electric signal of each photoreceptor element is compared with Vth' at each time, and a time when the electric-signal level becomes lower than or equal to Vth' is calculated, whereby the amount of optical energy projected on the photoreceptor element per unit time can be known. More specifically, the electric-signal level of the first photoreceptor element (photoreceptor element associated with the high-luminance region), changing as indicated by the line 303 in FIG. 3, becomes lower than or equal to Vth' at time T1' shown in FIG. 3. Thus, a value (Vinit−Vth')/T1' is calculated, and a pixel value of the corresponding pixel is set based on the value.

Figure 11:
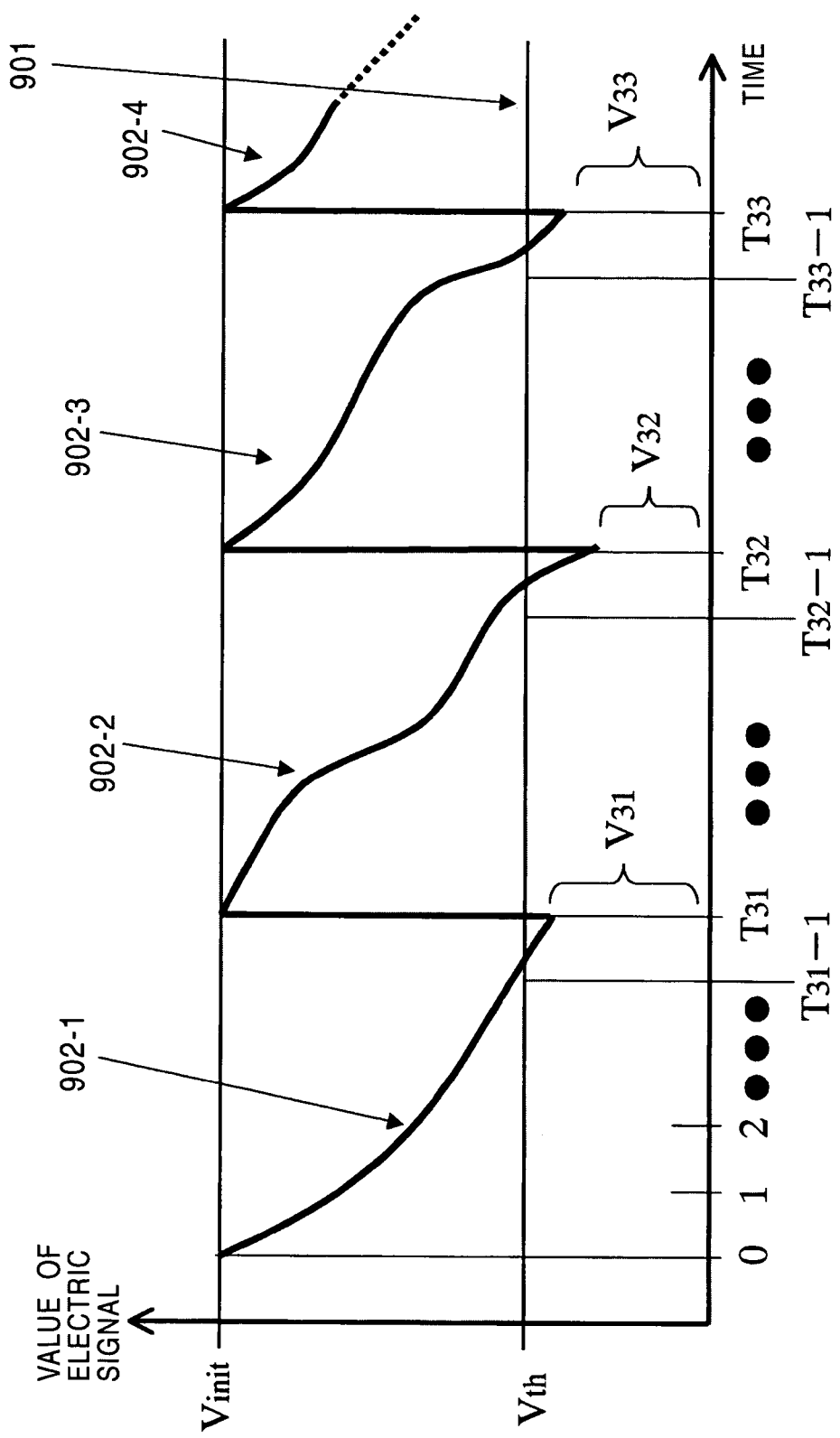
FIG. 11 is a timing chart showing macro signal transitions in the signal processing unit of the imaging apparatus according to the third embodiment.

Similarly, the electric-signal level of the second photoreceptor element (photoreceptor element associated with the intermediate-luminance region), changing as indicated by the line 304 in FIG. 3, becomes lower than or equal to Vth' at time T2' shown in FIG. 3. Thus, a value (Vinit−Vth')/T2' is calculated, and the value is used as pixel data of the corresponding pixel. This is illustrated in FIG. 11 of "YOSHIMURA Shinichi, "CMOS imeeji sensaa no kougashitsuka to apurikeeshon", Technical Report of IEICE, ICD 2001-97."

The electric-signal level of the third photoreceptor element (photoreceptor element associated with the low-luminance region), changing as indicated by the line 305 in FIG. 3, has a gradient of substantially zero, so that the signal level does not cross Vth', i.e., the level of the threshold electric signal in the imaging apparatus according to the related art, within a maximum imaging time (Tz) of the apparatus. Therefore, pixel data associated with the third photoreceptor element is too dark to allow measurement.

In contrast to the related art, in the imaging apparatus according to this embodiment, a threshold electric-signal level Vth(t) that changes as time elapses (a function whose value increases in accordance with time(t)) is used. The electric signal of each photoreceptor element is compared with Vth(t) at each time, and a time when the electric-signal level becomes lower than or equal to Vth(t) is calculated, whereby the amount of optical energy projected on the photoreceptor element per unit time can be known.

More specifically, the electric-signal level of the first photoreceptor element (photoreceptor element associated with the high-luminance region), indicated by the line 303, becomes lower than or equal to the threshold electric-signal level Vth(t) at time T1 shown in FIG. 3. The time T1 is recorded in the storage device 103 of the signal processing unit 100 described earlier with reference to FIGS. 1A and 1B. The value recorded is output to the calculation unit 111. The calculation unit 111 calculates a value (Vinit−Vth(T1))/T1, which is in accordance with the amount of optical energy received by the first photoreceptor element (photoreceptor element associated with the high-luminance region) per unit time, and a pixel value of the corresponding pixel is set based on the result of calculation. The pixel value is fed to the image output unit 112 to display a corresponding image. The value (Vinit−Vth(T1))/T1, calculated in the calculation unit 111, represents the amount of optical energy that is incident on the first photoreceptor element per unit time.

Similarly, the electric-signal level of the second photoreceptor element (photoreceptor element associated with the intermediate-luminance region), indicated by the line 304, becomes lower than or equal to the threshold electric-signal level Vth(t) at time T2 shown in FIG. 3. The time T2 is recorded in the storage device 103 of the signal processing unit 100 described earlier with reference to FIGS. 1A and 1B. The value recorded is output to the calculation unit 111. The calculation unit 111 calculates a value (Vinit−Vth(T2))/T2, which is in accordance with the amount of optical energy received by the second photoreceptor element (photoreceptor element associated with the intermediate-luminance region) per unit time, and a pixel value of the corresponding pixel is set based on the result of calculation. The pixel value is fed to the image output unit 112 to display a corresponding image.

Now, how the electric-signal level of the third photoreceptor element (photoreceptor element associated with the low-luminance region) changes will be considered. The gradient of change in the electric-signal level of the third photoreceptor element (photoreceptor element associated with the low-luminance region) is substantially zero, as indicated by the line 305. However, since the threshold electric-signal level Vth(t) becomes higher as time elapses, the electric-signal level of the third photoreceptor element (photoreceptor element associated with the low-luminance region) becomes lower than the threshold electric-signal level Vth(t) at time T3. The time T3 is within the maximum imaging time (Tz) of the imaging apparatus. The time T3 is recorded in the storage device 103 of the signal processing unit 100 described earlier with reference to FIGS. 1A and 1B, and the value recorded is output to the calculation unit 111. The calculation unit 111 calculates a value (Vinit−Vth(T3))/T3, which is in accordance with the amount of optical energy received by the third photoreceptor element (photoreceptor element associated with the low-luminance region) per unit time, and sets a pixel value of the corresponding pixel based on the result of calculation. The pixel value is fed to the image output unit 112 to display a corresponding image.

As described above, in the imaging apparatus according to this embodiment, the threshold electric-signal level that is used for comparison with the electric-signal levels of the photoreceptor elements is represented by the function Vth(t) whose value increases in accordance with time (t). According to the related art, imaging of a low-luminance region has been substantially inhibited since the amount of energy received by a photoreceptor element associated therewith is so low that the electric-signal level of the photoreceptor element does not become lower than or equal to the threshold value within the maximum imaging time (Tz). In contrast, according to this embodiment, the electric-signal level of a photoreceptor element associated with a low-luminance region crosses the threshold value Vth(t) whose value increases in accordance with time. (t). Accordingly, a value (Vinit−Vth(T3))/T3 can be calculated, which is in accordance with the amount of optical energy received by the photoreceptor element per unit time, so that a pixel value of the pixel corresponding to the photoreceptor element that receives light having a low luminance can be calculated.

As described above, according to the first embodiment of the present invention, when an object having both a high-luminance region and a low-luminance region is imaged, the pixel value of each pixel can be calculated with high precision, so that a clear image can be obtained. That is, the "first shortcoming of the related art" is overcome, similarly to "YOSHIMURA Shinichi, "CMOS imeeji sensaa no kougashitsuka to apurikeeshon", Technical Report of IEICE, ICD 2001-97".

Furthermore, according to this embodiment, as compared with the related art in which a constant threshold value Vth' is used, time that is taken until the electric-signal level of a photoreceptor element associated with a low-luminance region crosses a threshold value is shortened. Thus, the "third shortcoming of the related art", described in the related art section, i.e., the problem that a considerable time is taken before a threshold value Vth is crossed by the electric-signal level of a photoreceptor element on which very little optical energy is incident per unit time, is overcome by this embodiment.

In the imaging apparatus according to this embodiment, signal processing units like the one shown in FIGS. 1A and 1B are provided respectively for all the photoreceptor elements in the imaging apparatus, including the first, second, and third photoreceptor elements described above, and the threshold electric signal Vth(t) whose value increases in accordance with time is input to each of the comparators of the respective signal processing units.

Second Embodiment

Next, a second embodiment of the present invention will be described in detail. In the second embodiment, a photoreceptor element on which a high-luminance region (bright region) is projected executes imaging at a shorter interval than a photoreceptor element on which a low-luminance region (dark region) is projected. According to this embodiment, an image including both a high-luminance region and a low-luminance region can be captured clearly. Furthermore, when successive images of an object having a bright region and a dark region are captured and change in the luminance of the bright region is analyzed, the change in the luminance can be analyzed more precisely, and images of both the bright and dark regions can be captured clearly.

Figure 4:
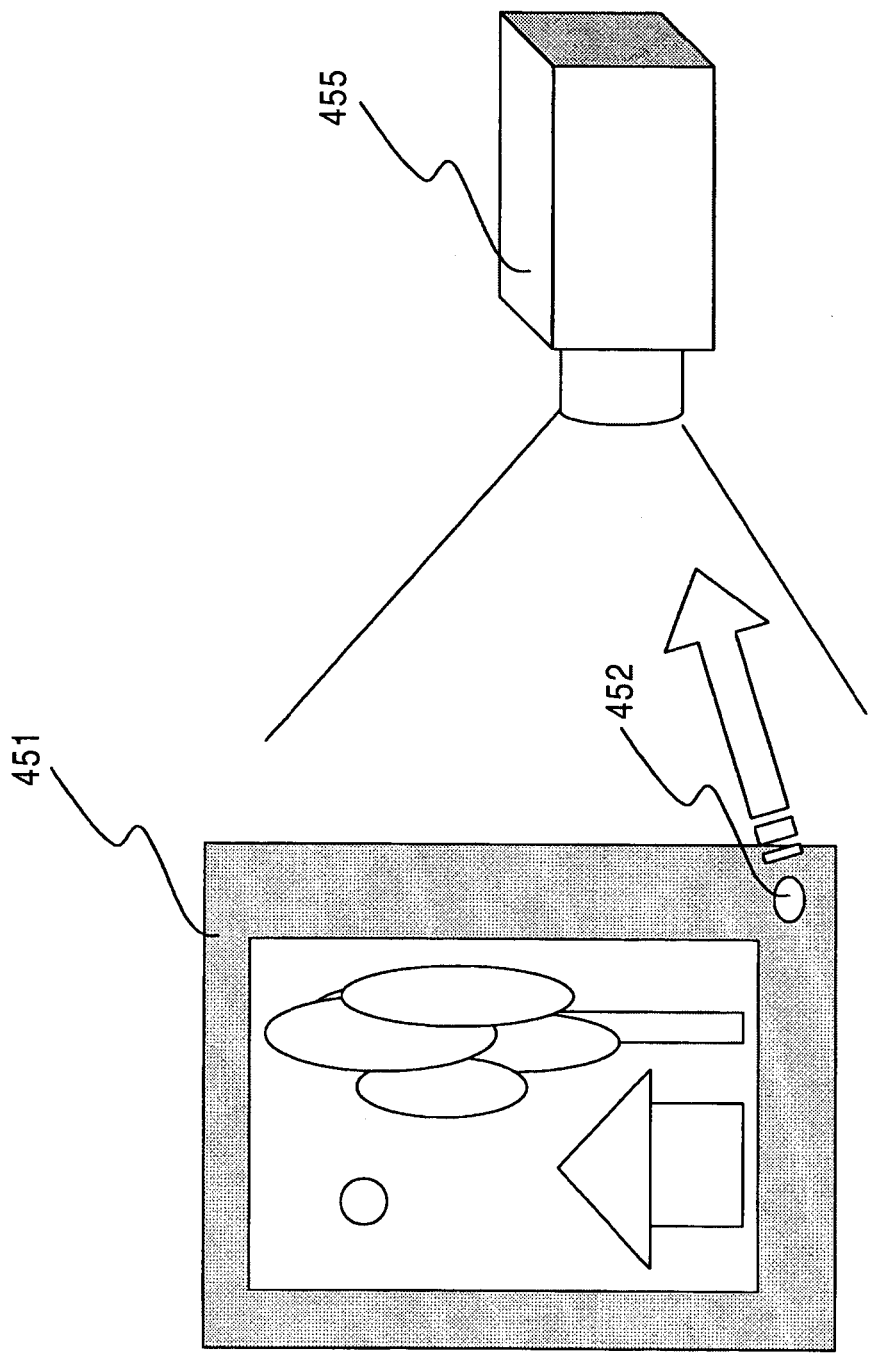
FIG. 4 is a diagram showing an example arrangement for imaging an object having a region where luminance is changing.

An example of an imaging apparatus that analyzes change in luminance will be described with reference to FIG. 4. Referring to FIG. 4, a picture 451 is provided with a flashing device 452 for sending information by flashing light. An imaging device 455 images the picture 451 together with the flashing device 452, and analyzes a flashing pattern of the flashing device 452. By analyzing the flashing pattern, various information, for example, information regarding the artist that painted the picture 451 and description of the picture 451, can be obtained. With this arrangement, in which the luminance of the picture 451 itself is low and the luminance the flashing device 452 ranges from high to low, it is required that a low-luminance image be captured clearly and that change in the luminance of the flashing pattern be obtained accurately.

FIGS. 5A and 5B show the circuit configuration of a signal processing unit of an imaging device provided in the imaging apparatus according to the second embodiment. Referring to FIG. 5A, a photoreceptor unit 40 of the imaging apparatus includes m×n photoreceptor elements corresponding to an array of m horizontal and n vertical pixels. FIG. 5B is a diagram showing a signal processing unit 400 associated with one pixel. The imaging apparatus includes the same number of signal processing units like the one shown in FIG. 5B as the number of pixels m×n.

The signal processing unit 400 includes a photoreceptor element 401, a comparator 402, a flip-flop (FF) 403, a logic OR gate 404, a storage device 405, a logic OR gate 406, and a logic AND gate 407. The signal processing unit 400 may further include, as required, an amplifier circuit for amplifying an output of the photoreceptor element 401. The photoreceptor element 401 is, for example, a photodiode, and it outputs an electric signal in accordance with the amount of optical energy received during an exposure period to the comparator 402 via an output line.

The comparator 402 compares an electric-signal level of the photoreceptor element 401 with a threshold electric-signal level (Vth), for example, in terms of their respective voltage values. As in the first embodiment described earlier, the electric-signal level of the photoreceptor element 401 becomes lower as an exposure time elapses.

The comparator 402 sends an output to the flip-flop 403 when the electric-signal level of the photoreceptor element 401 is lowered to the threshold electric-signal level (Vth) or below.

The flip-flop 403 is a one-bit flip-flop, and it captures and holds a result of comparison by the comparator 402 at a rise of a signal that is fed via a clock B terminal (ClkB).

The OR gate 404 outputs the result of a logic OR operation between a signal input from a next terminal (Next) and an output of the flip-flop 403. The signal input from the next terminal (Next) is usually set to "0". The signal input from the next terminal (Next) becomes "1" only when an output signal from the comparator 402 is to be forcibly assumed even though an output signal is not output by the comparator 402. Thus, it can be assumed that the output of the OR gate 404 is usually equivalent to the output of the flip-flop 403. In the subsequent description, it is assumed that the OR gate 404 outputs the output of the flip-flop 403 as it is.

The storage device 405 is a digital memory. The content stored in the storage device (digital memory) 405 is all deleted when an initialize signal (Initialize) is externally fed from an initial terminal to a clear terminal (Clear) of the storage device (digital memory) 405. The storage device 405 is capable of recording a plurality of times in the form of digital data. More specifically, the storage device (digital memory) 405, after a signal is received via the clear terminal (Clear) thereof, counts the number of clocks input from a clock terminal A (ClkA), and records a current number of clocks each time the OR circuit 404 outputs an output signal (that is, each time the flip-flop 403 outputs an output signal).

In contrast to the storage device 103 (refer to FIG. 1) in the first embodiment described earlier, which is capable of recording only a single set of time data, the storage device (digital memory) 405 in the second embodiment is capable of recording a plurality of sets of time data.

The OR gate 406 performs a logic OR operation between the initialize signal (Initialize) that is externally fed from the initial terminal, described earlier, and the output of the OR gate 404 (i.e., the output of the flip-flop 403), and outputs the result to the AND gate 407.

The AND gate 407 performs a logic AND operation between a signal input from a clock C terminal (ClkC) and the output of the OR gate 406. The output of the AND gate 407 is used as a reset signal for the photoreceptor element 401.

The number of clocks recorded in the storage device (digital memory) 405 is output to a calculation unit 411. The calculation unit 411 receives the numbers of clocks for the respective pixels from the signal processing circuits associated with m×n photoreceptor elements constituting the photoreceptor unit 40, calculates luminance values in accordance with the numbers of clocks. The luminance values calculated are fed to an image output unit 412, which outputs a corresponding image.

The operation of the signal processing unit 400 shown in FIGS. 5A and 5B will be described with reference to a timing chart, shown in FIG. 6, of signals in the signal processing unit 400. The timing chart in FIG. 6 shows, from top to bottom, the initialize signal (Initialize) input to the storage device 405 and the OR gate 406, a clock signal A (ClkA) input to the storage device 405, a clock signal B (ClkB) input to the flip-flop (FF) 403, a clock signal C (ClkC) input to the AND gate 407, the signal output from the comparator 402 to the flip-flop (FF) 403, the signal output from the flip-flop (FF) 403, the signal output from the OR gate 406, and the signal output from the AND gate 407, which is used as a reset signal for the photoreceptor element 401.

Figure 5:
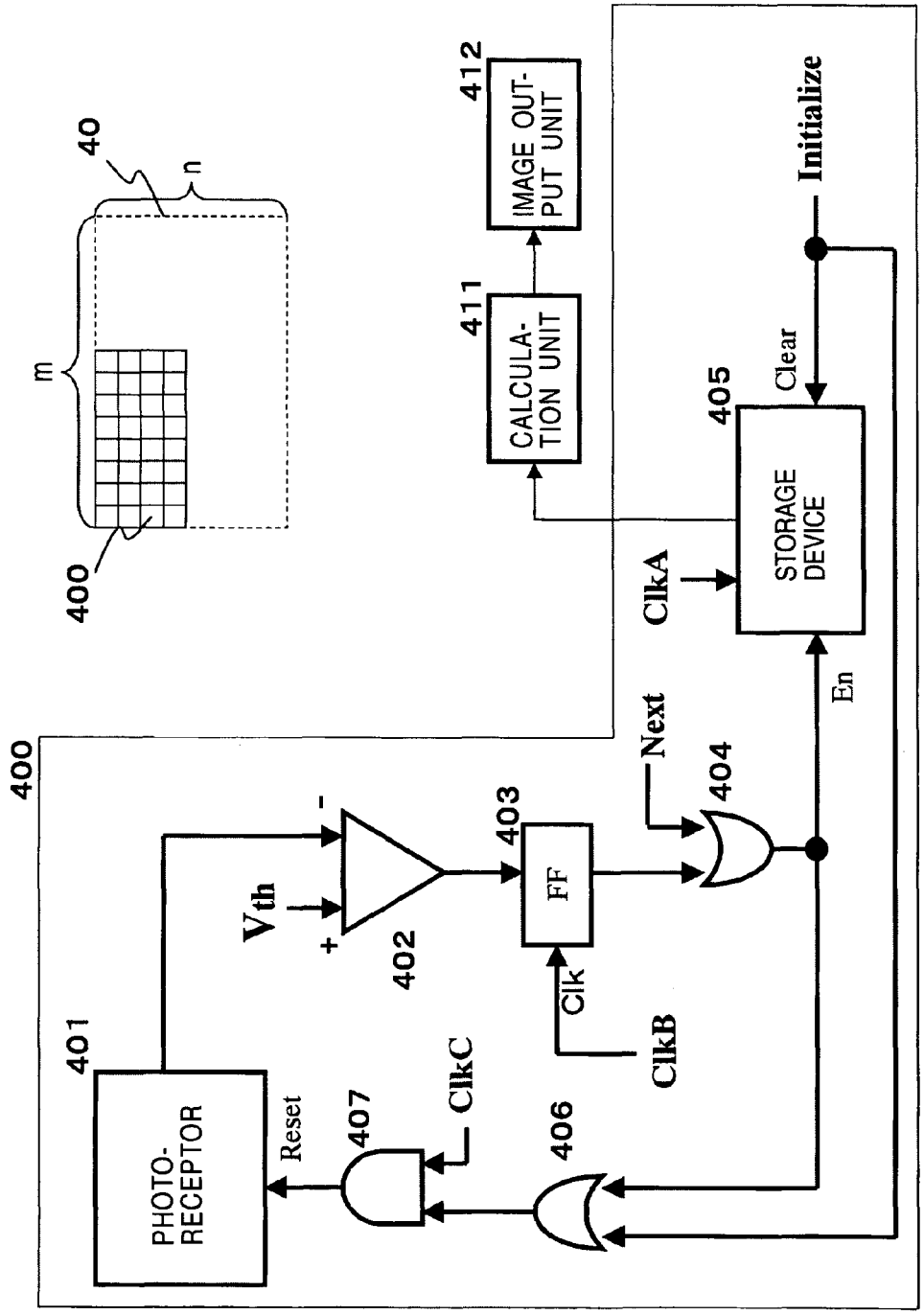
FIGS. 5A and 5B are diagrams showing the configuration of a signal processing unit of an imaging apparatus according to a second embodiment of the present invention.
Figure 6:
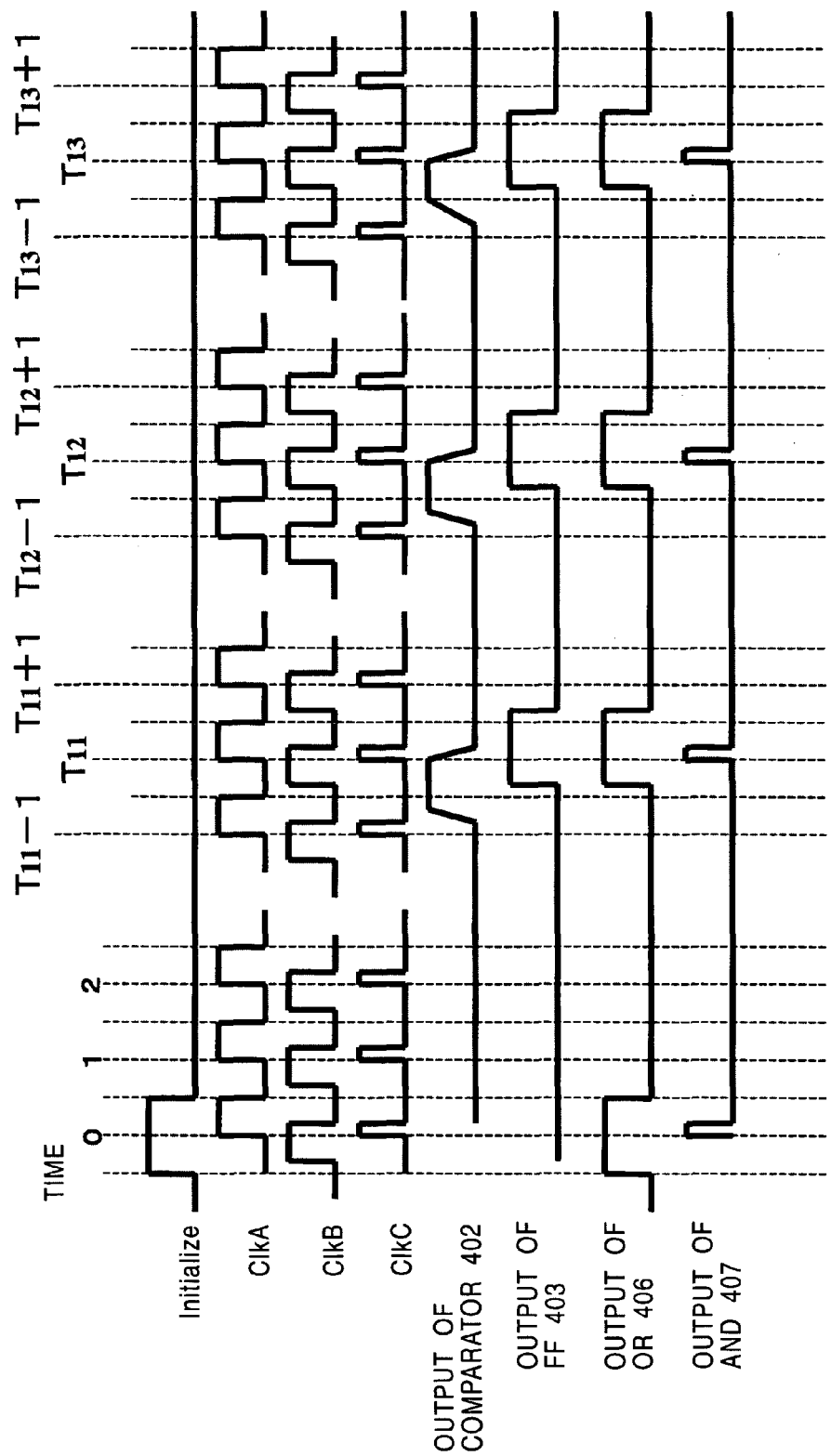
FIG. 6 is a timing chart showing signal transitions in the signal processing unit of the imaging apparatus according to the second embodiment.

FIG. 6 is a timing chart showing the operation of the circuitry associated with one pixel, shown in FIG. 5B. Units of time are controlled by the clock signal A (ClkA), the clock signal B (ClkB), and the clock signal C (ClkC). First, at time 0, the initialize signal (Initialize) is fed to carry out initialization.

In response to the initialize signal (Initialize), the output of the OR gate 406 goes High, as shown in the vicinity of time 0 in FIG. 6. The output of the OR gate 406 is then ANDed with the clock signal C (ClkC) by the AND gate 407, so that the output of the AND gate 407 goes High upon a rise of the clock signal C (ClkC), as shown in the vicinity of time 0 in FIG. 6, whereby the photoreceptor element 401 is reset. Upon the reset, the electric-signal level of the photoreceptor element 401 is set to an initial-setting electric-signal level (Vinit).

The electric signal of the photoreceptor element 401 is gradually attenuated from the initial-setting electric-signal level (Vinit) by optical energy that is received by exposure. The comparator 402 compares the electric-signal level of the photoreceptor element 401 and a threshold value (Vth), and outputs a signal at a time when the electric-signal level of the photoreceptor element 401 becomes lower than or equal to the threshold value (Vth) (in the vicinity of time T11 in FIG. 6).

The signal output from the comparator 402 is captured by the flip-flop 403 at a rise of the clock B (ClkB) at time T11, and the signal resets the photoreceptor element 401 through the OR gate 406 and the AND gate 407. The storage device (digital memory) 405 records the number of clocks counted by that time from the time of initialization (t=0) (i.e., the value T11).

The photoreceptor element 401, upon being reset, is again set to the initial-setting electric-signal level (Vinit), so that the output from the comparator 402 stops. That is, the output of the comparator 402 goes Low, as shown in the vicinity of time T11 in the part of the output of the comparator 402 in FIG. 6.

Furthermore, as time elapses, the electric-signal level of the photoreceptor element 401, which serves as an input to the comparator 402, is lowered by exposure of the photoreceptor element 401, and becomes lower than or equal to the threshold value (Vth), as shown in the vicinities of time T12 and time T13 in FIG. 6.

In the vicinities of time T12 and time T13 shown in FIG. 6, a process that is similar to the process executed in the vicinity of time T11 is executed. That is, the comparator 402 outputs an output signal, the storage device 405 records time T12 and time T13, and the photoreceptor element 401 is reset. Thus, in successive exposure processes, the storage device 405 sequentially records data of time T11, time T12, time T13, and so forth when the electric-signal level of the photoreceptor element 401 becomes lowered to the threshold value or below.

The operating rates of the clocks for controlling signal processing operations, i.e., the clocks A to C (ClkA to ClkC) in FIG. 6, are chosen so as to be sufficiently faster than change in the electric-signal level of the photoreceptor element 401. Thus, the change in the electric-signal level of the photoreceptor element 401 can be associated with the number of clocks recorded in the storage device 405 with a sufficient precision. That is, when the level of the electric signal input from the photoreceptor element 401 to the comparator 402 becomes equal to the threshold electric-signal level (Vth), a signal is output from the comparator 402 and fed to the storage device 405 via the flip-flop 403 and the OR gate 404; then, based on the signal, the storage device 405 records the number of clocks, which represents change in the electric-signal level of the photoreceptor element 401, i.e., the amount of optical energy received by exposure, with a good precision. Accordingly, the calculation unit 411 calculates luminance values (pixel values) precisely in accordance with the numbers of clock cycles recorded, and outputs the precise values to the image output unit 412.

Now, with reference to FIG. 7, how the threshold electric-signal level temporally changes, and counting of clocks in the storage device 405, which constitute features of this embodiment, will be described.

Figure 7:
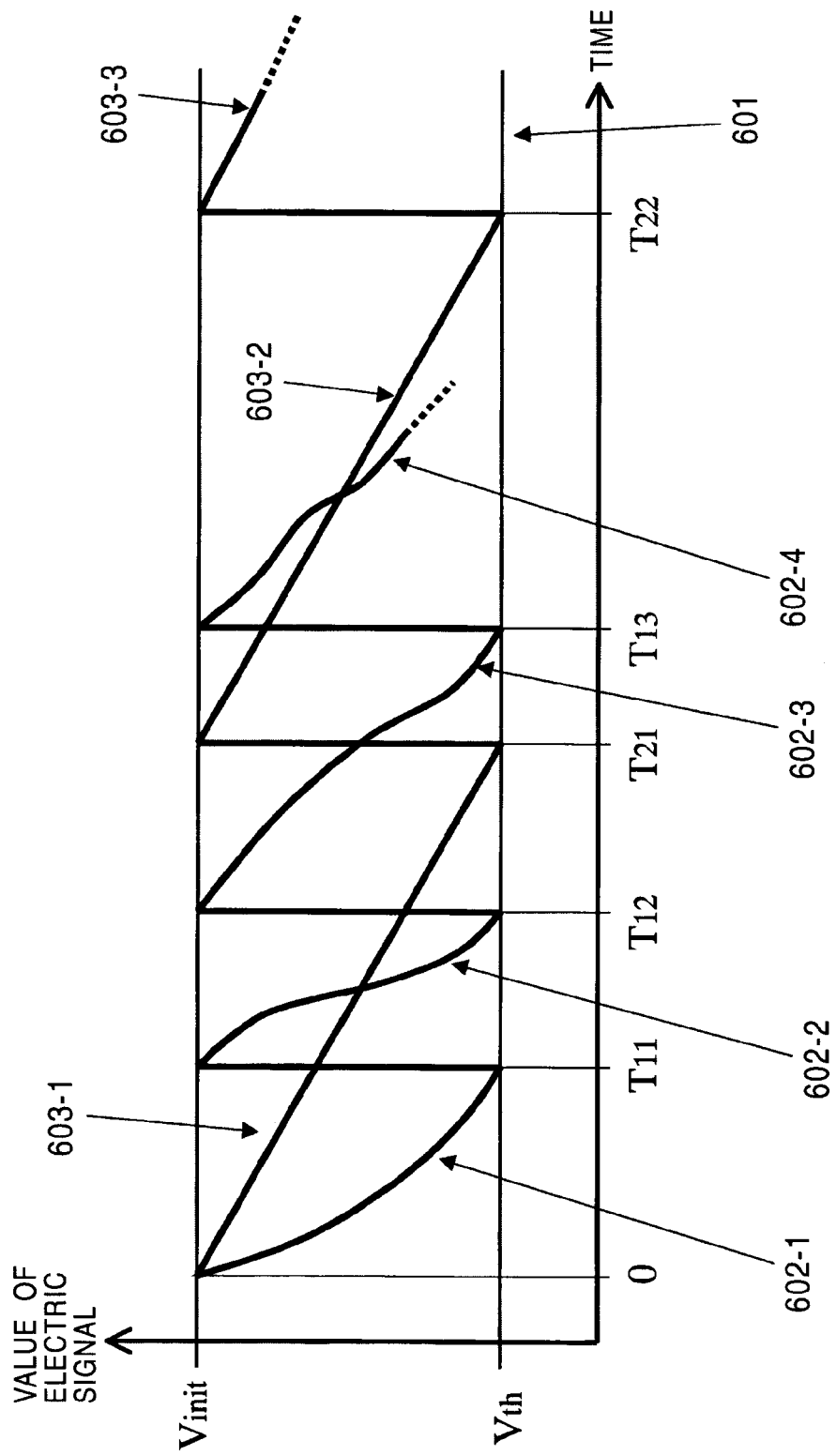
FIG. 7 is a timing chart showing macro signal transitions in the signal processing unit of the imaging apparatus according to the second embodiment.

FIG. 7, with an X axis representing elapse of time (t) and a Y axis representing electric-signal level (e.g., voltage value), shows temporal changes 602 and 603 of the electric-signal levels of two photoreceptor elements that receive lights of two different luminance levels, and a constant level Vth 601 of a threshold electric signal that is input to the comparator 402 in the imaging apparatus according to this embodiment.

The time intervals on the time axis shown in FIG. 7 are considerably longer than the time intervals on the time axis shown in FIG. 6, so that FIG. 7 shows the operation as continuous with respect to time. It can be considered that FIG. 6 shows the micro operation while FIG. 7 shows the macro operation.

In FIG. 7, a solid line 601 represents the level of the threshold electric signal (Vth) that is input to the comparator 402 in the imaging apparatus according to this embodiment. The level Vth represented by the solid line 601 is a constant value that does not change in time. Obviously, the level Vth may be a function whose value increases in accordance with time as in the first embodiment described earlier. In this embodiment, however, for simplicity, it is assumed that the level Vth of the threshold electric signal (Vth) is maintained constant.

As described earlier with reference to FIG. 6, an electric signal at a predetermined initial-setting electric-signal level (Vinit) is set to each photoreceptor element at time t=0.

Exposure of each photoreceptor element starts at t=0. Now, two photoreceptor elements (a fourth photoreceptor element and a fifth photoreceptor element) will be considered. Let it be assumed that, of an object to be imaged, a region that becomes very bright or somewhat bright (a region where brightness changes in time, i.e., a luminance-changing region) is projected on the fourth photoreceptor element. Also, let it be assumed that a dark region (low-luminance region) of the object to be imaged is projected on the fifth photoreceptor element.

The electric-signal levels of the respective photoreceptor elements change in to time by exposure, as shown in FIG. 7. The electric-signal level of the fourth photoreceptor element (photoreceptor element associated with the luminance-changing region) tends to zero rather sharply (as indicated by 602-1, 602-2, 602-3, 602-4, . . . in FIG. 7) since the amount of optical energy that is incident on the fourth photoreceptor element per unit time is large. It is to be noted, however, that the rate of the electric-signal level of the fourth photoreceptor element tending to zero changes in time since the fourth photoreceptor element is receiving light of a region where luminance is changing. That is, as shown in FIG. 7, the gradient is not constant.

On the other hand, the electric-signal level of the fifth photoreceptor element (photoreceptor element associated with the low-luminance region) tends to zero rather gradually (as indicated by 603-1, 603-2, 603-3, . . . in FIG. 7).

The electric-signal level of each photoreceptor element is input to the associated comparator at each time, and is compared with the threshold electric-signal level (Vth). Then, a time when the level of the electric signal from the photoreceptor element becomes lower than or equal to the threshold electric-signal level (Vth) is recorded in the associated storage device. Thus, the amount of optical energy projected on the photoreceptor element can be known based on the time data recorded.

Furthermore, when the level of the electric signal from the photoreceptor element becomes lower than or equal to the threshold electric-signal level (Vth), the photoreceptor element is automatically reset. That is, an electric signal of the predetermined initial-setting electric-signal level (Vinit) is set to the photoreceptor element. This has already been described with reference to FIG. 6.

More specifically, the electric-signal level of the fourth photoreceptor element (photoreceptor element associated with the luminance-changing region), indicated by 602-1 in FIG. 7, becomes lower than or equal to the threshold electric-signal level (Vth) at time T11 shown in FIG. 7. The time T11 is recorded in the storage device (digital memory) 405 shown in FIG. 5, and the value recorded is output to the calculation unit 411. The calculation unit 411 calculates a value (Vinit−Vth)/T11, which is in accordance with the amount of optical energy received by the fourth photoreceptor element (photoreceptor element associated with the luminance-changing region) per unit time, and sets a pixel value of the corresponding pixel based on the result of calculation. The pixel value is fed to the image output unit 412 to display a corresponding image.

The value (Vinit−Vth)/T11 represents the amount of optical energy that is incident on the fourth photoreceptor element (photoreceptor element associated with the luminance-changing region) per unit time at time 0, or to be more precise, during the period from time 0 to time T11.

Furthermore, at time T11, simultaneously with the recording of the time T11 in the storage device 405, the fourth photoreceptor element (photoreceptor element associated with the luminance-changing region) is reset, whereby the electric-signal level of the fourth photoreceptor element (photoreceptor element associated with the luminance-changing region) is set to the initial-setting electric-signal level (Vinit).

After being reset, the fourth photoreceptor element again receives optical energy, so that the electric signal thereof is again attenuated (as indicated by 602-2 in FIG. 7). The electric-signal level becomes lower than or equal to the threshold electric-signal level (Vth) at time T12 shown in FIG. 7.

The time T12 is recorded in the storage device (digital memory) 405 shown in FIG. 5, and the value recorded is output to the calculation unit 411. The calculation unit 411 calculates a value (Vinit−Vth)/(T12−T11), which is in accordance with the amount of optical energy received by the fourth photoreceptor element (photoreceptor element associated with the luminance-changing region) per unit time, and sets a pixel value of the corresponding pixel based on the result of calculation. The pixel value is fed to the image output unit 412 to display a corresponding image.

The value (Vinit−Vth)/(T12−T11) represents the amount of optical energy that is incident on the fourth photoreceptor element (photoreceptor element associated with the luminance-changing region) per unit time at time T11, or to be more precise, during the period from time T11 to time T12.

Furthermore, at time T12, simultaneously with the recording of the time T12 in the storage device 405, the fourth photoreceptor element (photoreceptor element associated with the luminance-changing region) is reset, whereby the electric-signal level of the fourth photoreceptor element (photoreceptor element associated with the luminance-changing region) is set to the initial-setting electric-signal level (Vinit).

After being reset, the fourth photoreceptor element again receives optical energy, so that the electric signal thereof is attenuated (as indicated by 602-3 in FIG. 7). The electric-signal level becomes lower than or equal to the threshold electric-signal level (Vth) at time T13 shown in FIG. 7. The time T13 is recorded in the storage device (digital memory) 405 shown in FIG. 5, and the value recorded is output to the calculation unit 411. The calculation unit 411 calculates a value (Vinit−Vth)/(T13−T12), which is in accordance with the amount of optical energy received by the fourth photoreceptor element (photoreceptor element associated with the luminance-changing region) per unit time, and sets a pixel value of the corresponding pixel based on the result of calculation. The pixel value is fed to the image output unit 412 to display a corresponding image.

The value (Vinit−Vth)/(T13−T12) represents the amount of optical energy that is incident on the fourth photoreceptor element (photoreceptor element associated with the luminance-changing region) per unit time, or to be more precise, during the period from time T12 to time T13.

Furthermore, at time T13, simultaneously with the recording of the time T13 in the storage device 405, the fourth photoreceptor element (photoreceptor element associated with the luminance-changing region) is reset, whereby the electric-signal level of the fourth photoreceptor element (photoreceptor element associated with the luminance-changing region) is set to the initial-setting electric-signal level (Vinit).

After being reset, the fourth photoreceptor element again receives optical energy, so that the electric signal thereof is attenuated (as indicated by 602-4 in FIG. 7). Similarly, times when the electric-signal level of the fourth photoreceptor element (photoreceptor element associated with the luminance-changing region) becomes lower than or equal to the threshold electric-signal level (Vth) are recorded sequentially in the storage device 405, and simultaneously with the recording operation, the fourth photoreceptor element is reset to the initial-setting electric-signal level (Vinit).

The operation described above is continued for a certain period (until time Tx that is not shown). It is to be noted that changes represented by 602-1, 602-2, 602-3, and 602-4 in FIG. 7 are not linear because a region of an object to be imaged that becomes very bright or somewhat bright (a region where brightness changes in time) is projected on the fourth photoreceptor element.

Next, change in the electric-signal level of the fifth photoreceptor element (photoreceptor element associated with the low-luminance region), and recording of data associated therewith will be described. The electric-signal level of the fifth photoreceptor element (photoreceptor element associated with the low-luminance region), indicated by 603-1 in FIG. 7, becomes lower than or equal to the threshold electric-signal level (Vth) at time T21 shown in FIG. 7. The time T21 is recorded in the storage device (digital memory) 405 shown in FIG. 5, and the value recorded is output to the calculation unit 411. The calculation unit 411 calculates a value (Vinit'Vth)/T21, which is in accordance with the amount of optical energy received by the fifth photoreceptor element (photoreceptor element associated with the low-luminance region) per unit time, and sets a pixel value of the corresponding pixel based on the result of calculation. The pixel value is fed to the image output unit 412 to display a corresponding image.

The value (Vinit−Vth)/T21 represents the amount of optical energy that is incident on the fifth photoreceptor element (photoreceptor element associated with the low-luminance region) per unit time at time 0, or to be more precise, during the period from time 0 to time T21.

Furthermore, at time T21, simultaneously with the recording of the time T21 in the storage device 405, the fifth photoreceptor element (photoreceptor element associated with the low-luminance region) is reset, whereby the electric-signal level of the fifth photoreceptor element (photoreceptor element associated with the low-luminance region) is set to the initial-setting electric-signal level (Vinit).

After being reset, the fifth photoreceptor element again receives optical energy, so that the electric signal thereof is attenuated (as indicated by 603-2 in FIG. 7). The electric-signal level becomes lower than or equal to the threshold electric-signal level (Vth) at time T22 shown in FIG. 7. The time T22 is recorded in the storage device (digital memory) 405 shown in FIG. 5, and the value recorded is output to the calculation unit 411. The calculation unit 411 calculates a value (Vinit−Vth)/(T22−T21), which is in accordance with the amount of optical energy received by the fifth photoreceptor element (photoreceptor element associated with the low-luminance region) per unit time, and sets a pixel value of the corresponding pixel based on the result of calculation. The pixel value is fed to the image output unit 412 to display a corresponding image.

The value (Vinit−Vth)/(T22−T21) represents the amount of optical energy that is incident on the fifth photoreceptor element (photoreceptor element associated with the low-luminance region) per unit time at time T21, or to be more precise, during the period from time T21 to time T22.

Furthermore, at time T22, simultaneously with the recording of the time T22 in the storage device 405, the fifth photoreceptor element (photoreceptor element associated with the low-luminance region) is reset, whereby the electric-signal level of the fifth photoreceptor element (photoreceptor element associated with the low-luminance region) is set to the initial-setting electric-signal level (Vinit).

After being reset, the fifth photoreceptor element again receives optical energy, so that the electric signal thereof is attenuated (as indicated by 602-3 in FIG. 7). Similarly, times when the electric-signal level of the fifth photoreceptor element (photoreceptor element associated with the low-luminance region) becomes lower than or equal to the threshold electric-signal level (Vth) are sequentially recorded in the storage device 405, and simultaneously with the recording operation, the fifth photoreceptor element is reset to the initial-setting electric-signal level (Vinit).

The operation described above is continued for a certain period (until time Tx that is not shown). It is to be noted that the changes indicated by 603-1, 603-2, and 603-3 in FIG. 7 have smaller gradients compared with the changes indicated by 602-1, 602-2, 602-3, and 602-4 since a somewhat dark region of an object to be imaged is projected on the fifth photoreceptor element.

Although the operations of the fourth photoreceptor element and the fifth photoreceptor element have been described with reference to the same figure (FIG. 5), the fourth photoreceptor element and the fifth photoreceptor element each have a signal processing unit like the one shown in FIG. 5, as described earlier.

As is understood from the above description, as data relating to the pixel associated with the fourth photoreceptor element (photoreceptor element associated with the luminance-changing region), the amount of optical energy that is incident per unit time at time 0, the amount of optical energy that is incident per unit time at time T11, the amount of optical energy that is incident per unit time at time T12, and so forth, are obtained.

This means that light that is incident on the fourth photoreceptor element (photoreceptor element associated with the luminance-changing region) is measured at a short time interval, i.e., at time 0, time T11, time T12, and so forth. That is, when an object whose brightness rapidly changes in time over a dark background is imaged, how the brightness of the object is rapidly changing in time can be measured at a short time interval, serving to obtain precise information regarding the change in luminance.

Furthermore, as data relating to the pixel associated with the fifth photoreceptor element (photoreceptor element associated with the low-luminance region), the amount of optical energy that is incident per unit time at time 0, the amount of optical energy that is incident per unit time at time T21, and so forth, are obtained.

This means that light that is incident on the fifth photoreceptor element is measured at a long time interval, i.e., at time 0, time T21, and so forth. The amount of optical energy that is incident per unit time from time 0 to time Tx can be known by averaging the values for these times. That is, when an object whose brightness is rapidly changing in time over a dark background is imaged, a projection image of a dark region is prevented from becoming completely black, and accurate pixel data for the region can be obtained.

As described above, according to the second embodiment, when an object having a region where luminance is relatively high and is changing in time and also having a region with a low luminance is imaged, how the luminance is rapidly changing in time can be known more precisely, and an image can be output without making a projection image of the dark region completely black. This means that the "second shortcoming of the related art", described in the related art section, is overcome.

With regard to a pixel on which the bright region is projected (corresponding to the fourth photoreceptor element), the average brightness during the period from time 0 to time Tx can be obtained from the average values at time 0, time T11, time T12, and so forth without causing an overflow. This means that the "first shortcoming of the related art" is overcome.

Third Embodiment

Next, a third embodiment of the present invention will be described. The third embodiment is-a partial modification of the imaging apparatus according to the second embodiment. According to the third embodiment, the amount of optical energy received by each photoreceptor element per unit time can be calculated precisely, serving to obtain precise pixel data.

Figure 8:
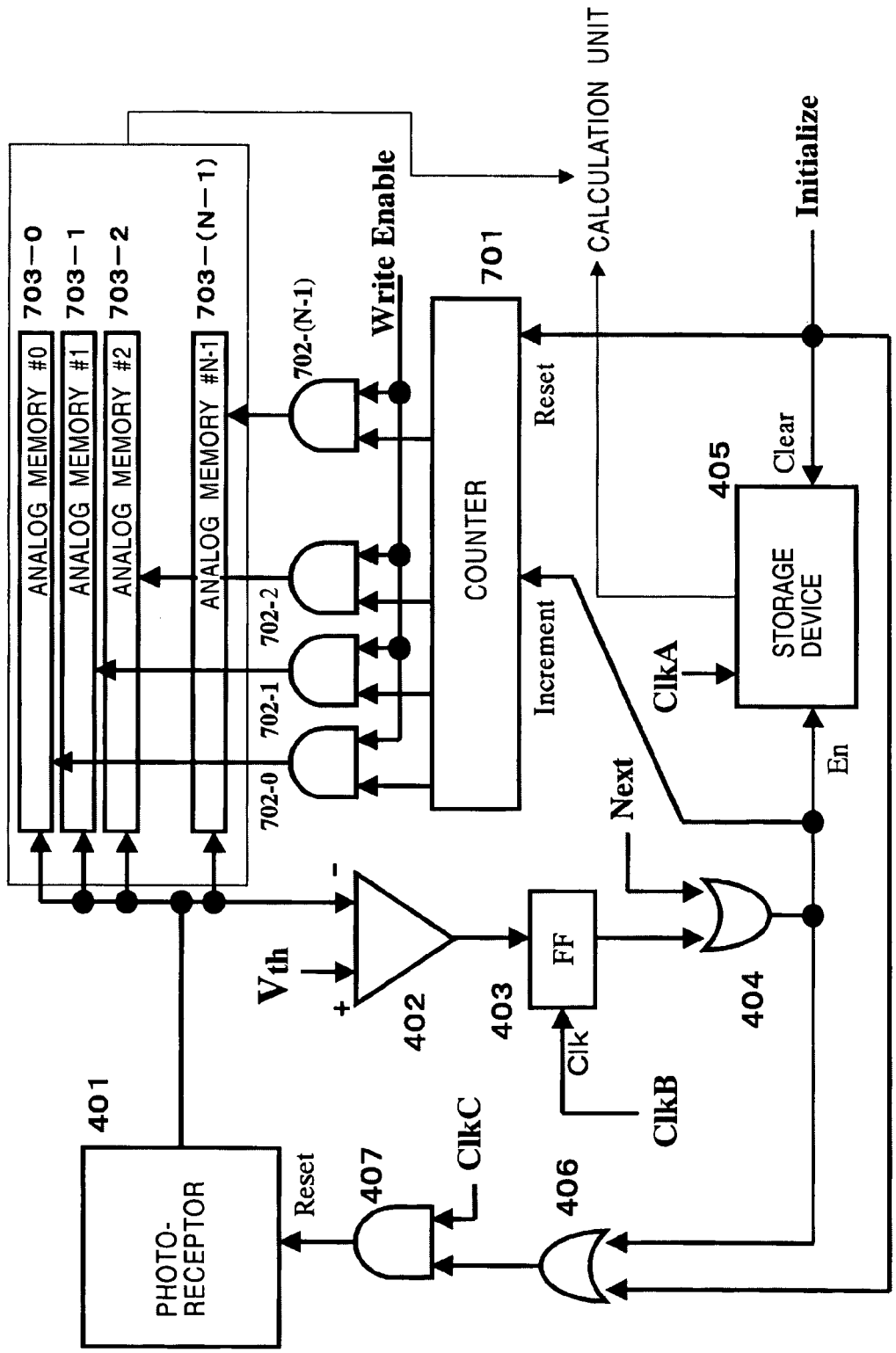
FIG. 8 is a diagram showing the configuration of a signal processing unit of an imaging apparatus according to a third embodiment of the present invention.

FIG. 8 shows the circuit configuration of a signal processing unit that is provided for each imaging element in an imaging apparatus according to the third embodiment. Similarly to the embodiments described above, a photoreceptor unit of the imaging apparatus includes m×n photoreceptor elements corresponding to an array of m horizontal and n vertical pixels. FIG. 8 shows a signal processing unit associated with one pixel. The imaging apparatus includes the same number of image processing units like the one shown in FIG. 8 as the number of pixels m×n.

In FIG. 8, components corresponding to those in the second embodiment described earlier and shown in FIG. 5 are denoted by the same numerals. The signal processing unit in the third embodiment includes a photoreceptor element 401, a comparator 402, a flip-flop (FF) 403, a logic OR gate 404, a storage device 405, a logic OR gate 406, and a logic AND gate 407. The signal processing unit may further include, as required, an amplifier circuit for amplifying an output of the photoreceptor element 401. The photoreceptor element 401 is, for example, a photodiode, and it outputs an electric signal in accordance with the amount of optical energy received during an exposure period to the comparator 402 via an output line. The configuration described above is the same as in the second embodiment.

The signal processing unit in the third embodiment further includes a counter 701, N AND gates 702-0 to 702-N−1), and N analog memories 703-0 to 703-N−1). The AND gates 702-3 to 702-N−2) and the analog memories 703-3 to 703-N−2) are not shown. N is an arbitrary positive integer. The N analog memories 703-0 to 703-(N−1) read and store the electric-signal level of the photoreceptor element 401 as an analog value. Recording of the analog value will be described later.

In the arrangement shown in FIG. 8, the components 401 to 407 are the same as those in the second embodiment. That is, the electric-signal level of the photoreceptor element 401 is first set to the initial-setting electric-signal level (Vinit), and when the electric-signal level is lowered by exposure and becomes lower than or equal to the threshold value (Vth), the comparator 402 generates an output, and the storage device 405 records a time and the photoreceptor element 401 is reset.

The counter 701 is rest to "0" by an initialize signal (Initialize) that is externally fed thereto. Each time the output signal of the OR gate 404 (i.e., the output signal of the flip-flop 403) falls, an increment signal is input to the counter 701, whereby the counter value is incremented by one.

The N AND gates 702-0 to 702-N−1) output signals to the analog memories 703-0 to 703-N−1) respectively associated therewith based on input of a write enable signal (Write Enable) under the conditions shown in FIG. 9, as follows:

AND gate 702-0 outputs a signal to the analog memory 703-0 when the counter value is "0";
AND gate 702-1 outputs a signal to the analog memory 703-1 when the counter value is "1";
AND gate 702-2 outputs a signal to the analog memory 703-2 when the counter value is "2";
AND gate 702-3 outputs a signal to the analog memory 703-3 when the counter value is "3";
Similarly, AND gates 702-4 to 702-N−1) output signals to the analog memories 703-4 to 703-N−1) respectively associated therewith when the counter value is "4" to "N−1", respectively.

The analog memory 703-0 non-destructively records an electric signal generated by the photoreceptor element 401, based on a signal that is output from the AND gate 702-0 on condition that the value of the counter 701 is "0". "Nondestructively" herein means that the value of the electric signal generated by the photoreceptor element 401 is written to the analog memory 703-0 without being altered. A specific example of a non-destructive circuit can be found in "YOSHIMURA Shinichi, "CMOS imeeji sensaa no kougashitsuka to apurikeeshon", Technical Report of IEICE, ICD 2001-97", FIG. 8, entitled as "jukoubu to fureemu memoribu", which could be translated as "photoreceptor unit and frame memory".

Similarly, the analog memory 703-1 non-destructively records an electric signal generated by the photoreceptor element 401, based on a signal that is output from the AND gate 702-1 on condition that the value of the counter 701 is "1". The analog memory 703-2 non-destructively records an electric signal generated by the photoreceptor element 401, based on a signal that is output from the AND gate 702-2 on condition that the value of the counter 701 is "2".

Similarly, the other analog memories 703-3 to 703-N−1) non-destructively record electric signals generated by the photoreceptor element 401, based on signals that are output from the AND gates 702-3 to 702-N−1) on condition that the value of the counter 701 is "3" to "N−1", respectively.

Figure 10:
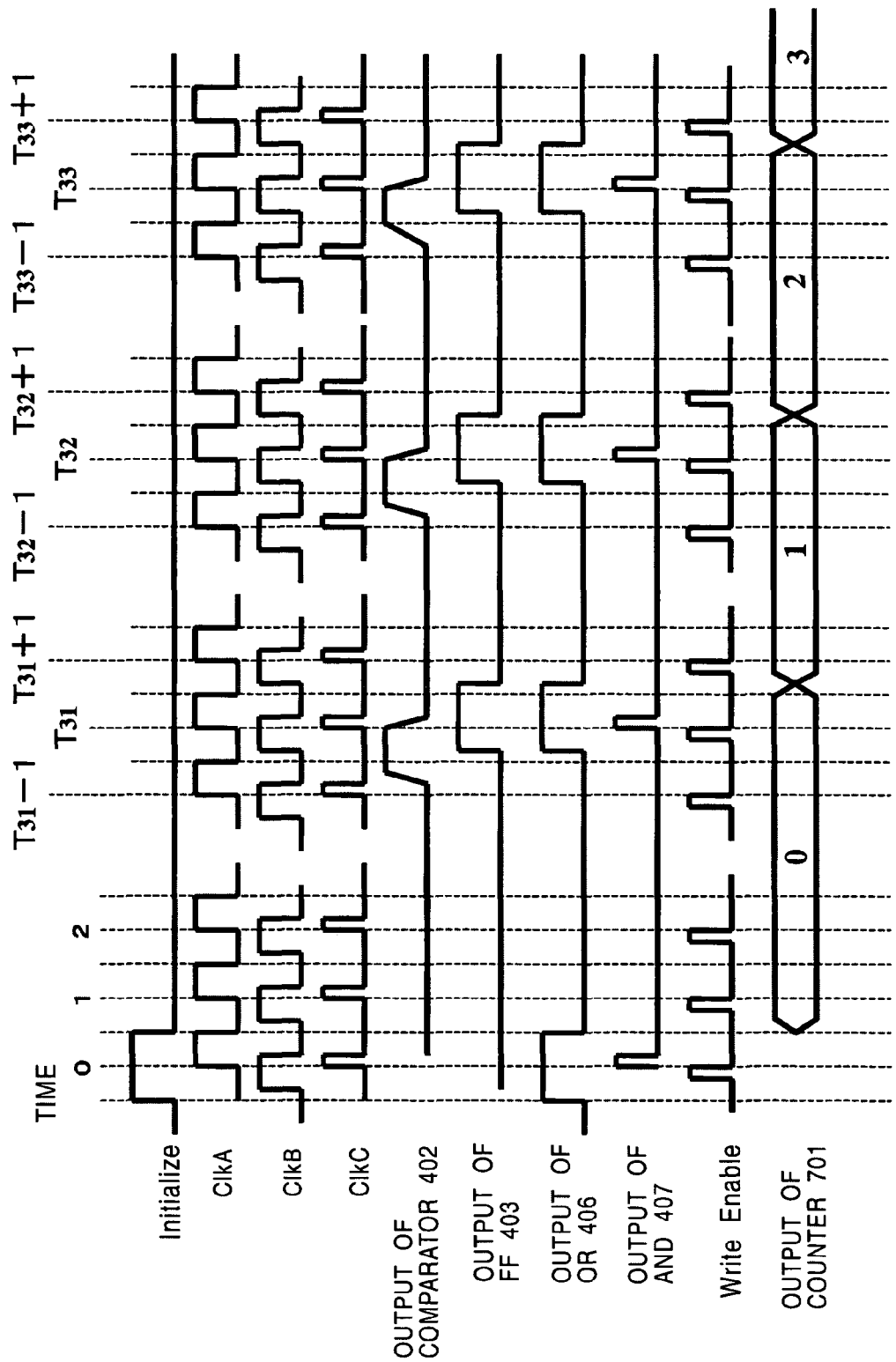
FIG. 10 is a timing chart showing signal transitions in the signal processing unit of the imaging apparatus according to the third embodiment.

The operation of the signal processing unit shown in FIG. 8 will be described with reference to a timing chart of relevant signals, shown in FIG. 10. The timing chart in FIG. 10 shows, from top to bottom, the initialize signal (Initialize) input to the storage device 405, the OR gate 406, and the counter 701, the clock signal A (ClkA) input to the storage device 405, the clock signal B (ClkB) input to the flip-flop (FF) 403, the clock signal C (ClkC) input to the AND gate 407, the signal output from the comparator 402 to the flip-flop (FF) 403, the signal output from the flip-flop (FF) 403, the signal output from the OR gate 406, the signal output from the AND gate 407, which serves as a reset signal for the photoreceptor element 401, the write enable signal that is output to the AND gates 702-0 to 702-(N−1), and the output of the counter 701.

With regard to the timing chart shown in FIG. 10, description will be made particularly focusing on points that differ from the timing chart for the second embodiment described earlier, shown in FIG. 6.

The write enable signal (Write Enable) is generated in each clock cycle, and is output to the AND gates 702-0 to 702-(N−1). Furthermore, at time 0, the initialize signal (Initialize) shown in FIG. 8 is output, and is input to the counter 701 as a reset signal, whereby the value of the counter 701 is reset to "0".

The electric-signal level of the photoreceptor element 401 is initially set to the initial-setting electric-signal level (Vinit). When the electric-signal level is lowered by exposure and becomes lower than or equal to the threshold value (Vth), the comparator 402 generates an output, and the value of the counter 701 is incremented by one each time the OR gate 404 outputs an output signal (i.e., each time the flip-flop 403 outputs an output signal).

Thus, until time T31, when the comparator 402 generates an output, the value of the counter 701 is maintained at "0". During that period, the AND gate 702-0 outputs a signal to the analog memory 703-0 each time a write enable signal (Write Enable) is input thereto, and the analog memory 703-0 records the electric-signal level of the photoreceptor element 401 as an analog value each time a signal is input thereto. The value recorded is overwritten each time, so that the analog memory 703-0, in the end, holds as a recorded value the electric-signal level of the photoreceptor element 401 at time T31, that is, at a time immediately before the value of the counter 701 is changed to "1".

The value of the counter 701 is updated (incremented) based on outputs generated by the comparator 402 when the electric-signal level of the photoreceptor element 401 is lowered by exposure and becomes lower than or equal to the threshold value (Vth). Thus, the analog memory 703-0 records the electric-signal level of the photoreceptor element 401 at a time immediately before the counter 701 is incremented at a clock timing after the electric-signal level of the photoreceptor element 401 becomes lower than or equal to the threshold value (Vth).

After that, the value of the counter 701 is maintained at "1" until time T32. During that period, the AND gate 702-1 outputs a signal to the analog memory 703-1 each time a write enable signal (Write Enable) is input thereto, and the analog memory 703-1 records the electric-signal level of the photoreceptor element 401 as an analog value each time a signal is input thereto. The value recorded is overwritten each time, so that the analog memory 703-1, in the end, holds as a recorded value the electric-signal level of the photoreceptor element 401 at time T32, i.e., at a time immediately before the value of the counter 701 is changed to "2".

After that, the value of the counter 701 is maintained at "2" until time T33. During that period, the AND gate 702-2 outputs a signal to the analog memory 703-2 each time a write enable signal (Write Enable) is input thereto, and the analog memory 703-2 records the electric-signal level of the photoreceptor element 401 as an analog value each time a signal is input thereto. The value recorded is overwritten each time, so that the analog memory 703-2, in the end, holds as a recorded value the electric-signal level of the photoreceptor element 401 at time T33, i.e., at a time immediately before the value of the counter 701 is changed to "3".

Similarly, in accordance with the value of the counter 701 being "3" to "N−1", the AND gates 702-3 to 702-(N−1) outputs signals to the analog memories 703-3 to 703-(N−1), and the analog memories 703-3 to 703-(N−1) hold as recorded values the electric-signal level of the photoreceptor element 401 at times immediately before the counter 701 is updated.

The operation clock in the second embodiment (one clock cycle of the clocks A, B, and C in FIG. 6) has been described as sufficiently faster than change in the electric-signal level of a photoreceptor element and therefore allows precise recording of a time when the electric-signal level of the photoreceptor element becomes lower than or equal to the threshold value (Vth). However, depending on the configuration of the apparatus, in some cases, it is inhibited to employ a fast clock. The third embodiment being described is effective in such cases.

Now, how the threshold electric-signal level changes in time, and recording of the electric-signal level in the analog memories 703-3 to 703-(N−1), which constitute features of this embodiment, will be described with reference to FIG. 11.

FIG. 11, with an X axis representing elapse of time (t) and a Y axis representing electric-signal level (e.g. voltage value), shows temporal change 902 of the electric-signal level of a photoreceptor element and a constant level Vth 901 of a threshold electric signal that is input to the comparator 402.

The time intervals on the time axis shown in FIG. 11 are based on an operation clock for controlling timing of outputting write enable signals (Write Enable) to the AND gates 702-1 to 702-(N−1), and time is represented by integers such as time t=0, 1, 2, . . . . That is, a write enable signal (Write Enable) is output to the AND gates 7021 to 702-(N−1) at time t=0, 1, 2, . . . .

In FIG. 11, a straight line 901 represents the level of the threshold electric signal (Vth) input to the comparator 402 of the imaging apparatus in this embodiment. Vth represented by the straight line 901 is a constant value that does not change in time. Obviously, Vth may be a function whose value increases in time as in the first embodiment described earlier. For simplicity, however, the threshold electric signal is maintained at a constant level (Vth) in this embodiment.

As described earlier with reference to FIG. 10, at t=0, an electric signal at a particular initial-setting electric-signal level (Vinit) is set to each photoreceptor element. At that time, the value of the counter 701 is reset to 0.

Exposure of each photoreceptor element starts at t=0. Now, a photoreceptor element (sixth photoreceptor element) will be considered. On the sixth photoreceptor element, of an object to be imaged, a region that becomes very bright or somewhat bright (a region where brightness changes in time) is projected. Thus, the electric-signal level of the sixth photoreceptor element changes in time, as shown in FIG. 11. The level of the sixth photoreceptor element tends to zero rather sharply since the amount of optical energy that is incident per unit time is large (as indicated by 902-1, 9022, 902-3, 902-4, . . . ). Furthermore, the rate of tending to zero changes in time (that is, the gradient is not constant in FIG. 11).

The electric-signal level of each photoreceptor element is compared with the level of the threshold electric signal (Vth) by the comparator 402 at each time (t=0, 1, 2, 3, . . . ). Furthermore, at each time, the electric signal of the photoreceptor element is recorded in an analog memory. At the time of recording, data recorded previously is overwritten with new data to be written, so that only the latest data is held.

Although the N analog memories 703-0 to 703-(N−1) are provided as shown in FIG. 10, only one analog memory determined by the value of the counter 701 records the electric-signal level of the photoreceptor element. Upon initialization, since the value of the counter 701 is "0", the electric-signal level is recorded in the zeroth analog memory 703-0.

The electric signal of the photoreceptor element 401 is attenuated by exposure. The amount of optical energy that is projected on the photoreceptor element 401 per unit time can be obtained by calculating a time when the level of the electric signal becomes lower than or equal to the level of the threshold electric signal (Vth) that is used for comparison by the comparator 402. The time herein is discrete, such as 0, 1, 2, . . . , so that time cannot be calculated more precisely than the operation clock. However, since the electric signal of the photoreceptor element 401 is recorded in the analog memory in each cycle of the operation clock, detailed information can be obtained from the data recorded.

When the electric-signal level of the photoreceptor element 401 becomes lower than or equal to the level of the threshold electric signal (Vth), the photoreceptor element 401 is reset to the initial-setting electric-signal level (Vinit). Furthermore, simultaneously with the reset operation, the value of the counter 701 is incremented by one.

When the counter 701 has been incremented, the output of the AND gate 702-0 stops and the output of the AND gate 702-1 starts. Thus, data that is recorded and held in the analog memory 703-0 in the end is the electric-signal level at a time immediately before the value of the counter 701 is updated after the electric-signal level of the photoreceptor element 401 becomes lower than or equal to the level of the threshold electric signal (Vth). After the value of the counter 701 has become "1", the electric signal of the photoreceptor element 401 is recorded in the analog memory 703-1.

The process described above is executed at times when the electric signal of photoreceptor element 401 is attenuated and the level thereof becomes lower than or equal to the level of the threshold electric signal (Vth) (at discrete times 0, 1, 2, . . . ). Thus, a plurality of times when the electric-signal level becomes lower than or equal to Vth is recorded in the digital memory 405, and the value of the counter 701 is incremented, whereby values of the electric signal at times when the electric-signal level becomes lower than or equal to Vth are sequentially recorded in the analog memories 703-0 to 703-(N−1).

More specifically, the electric-signal level of the sixth photoreceptor element, indicated by 902-1 in FIG. 11, becomes lower than or equal to the level of the threshold electric signal (Vth) at time T31 shown in FIG. 11. T31 herein is an integer. To be more precise, the time when the electric-signal level becomes lower than or equal to Vth is usually a rational number including a fractional part, and T31 is the smallest integer that is larger than the rational number.

The electric-signal level of the sixth photoreceptor element is higher than the level of the threshold electric signal (Vth) at time T31−1, and is lower than or equal to the level of the threshold electric signal (Vth) at time T31. The time T31 is recorded in the storage device (digital memory) 405 shown in FIG. 8. Furthermore, since the value of the counter 701 is "0" until time T31, the electric-signal level of the sixth photoreceptor element is recorded in the analog memory 703-0 at time t=0, 1, 2, . . . , and T31. At time T31, the counter 701 is incremented to 1. The analog memory 703-0 is overwritten each time until time T31, so that the value written last, i.e., the electric-signal level (V31) of the sixth photoreceptor element at time T31, is held.

The electric-signal level (V31) recorded in the analog memory 703-0 and the time (T31) recorded in the storage device (digital memory) 405 are output to the calculation unit 411. The calculation unit 411 calculates a value (Vinit−V31)/T31, which is in accordance with the amount of optical energy received by the photoreceptor element 401 per unit time, and sets a pixel value of the corresponding pixel based on the result of calculation. The pixel value is fed to the image output unit 412 to display a corresponding image.

The value (Vinit−V31)/T31 represents the amount of optical energy that is incident on the sixth photoreceptor element per unit time at time 0, or to be more precise, during the period from time 0 to time T31.

Furthermore, at time T31, the sixth photoreceptor element is reset, that is, the electric-signal level of the sixth photoreceptor element is set to the initial-setting electric-signal level (Vinit). After being reset, the sixth photoreceptor element again receives optical energy, so that the electric signal thereof is attenuated (as indicated by 902-2 in FIG. 11). The electric-signal level becomes lower than or equal to the threshold electric-signal level (Vth) at time T32 shown in FIG. 11.

T32 is an integer. To be more precise, the time when the electric-signal level becomes lower than or equal to Vth is usually a rational number including a fractional part, and T32 is the smallest integer that is larger than the rational number. The electric-signal level is higher than Vth at time T32−1, and is lower than or equal to Vth at time T32. The time T32 is recorded in the storage device (digital memory) 405 shown in FIG. 8. Furthermore, since the value of the counter 701 is "1" until time T32, the electric-signal level of the photoreceptor element 401 is recorded in the analog memory 703-1 at time t=T31+1, T31+2, T31+3, . . . , and T32. At time T32, the value of the counter 701 is incremented to "2".

Since the analog memory 703-1 is overwritten each time until time T32, the value written last, i.e., the electric-signal level (V32) of the photoreceptor element at time T32, is held therein.

The electric-signal level (V32) recorded in the analog memory 703-1 and the time (T32) recorded in the storage device (digital memory) 405 are output to the calculation unit 411. The calculation unit 411 calculates a value (Vinit−V32)/(T32−T31), which is in accordance with the amount of optical energy received by the photoreceptor element 401 per unit time, and sets a pixel value of the corresponding pixel based on the result of calculation. The pixel value is fed to the image output unit 412 to display a corresponding image.

The value (Vinit−V32)/(T32−T31) represents the amount of optical energy that is incident on the sixth photoreceptor element per unit time at time T31, or to be more precise, during the period from time T31 to time T32.

Furthermore, at time T32, the sixth photoreceptor element is reset, that is, the electric-signal level of the sixth photoreceptor element is set to the initial-setting electric-signal level (Vinit). After being reset, the sixth photoreceptor element again receives optical energy, so that the electric signal thereof is attenuated (as indicated by 902-3 in FIG. 11). The electric-signal level becomes lower than or equal to the threshold electric-signal level (Vth) at time T33 shown in FIG. 11.

T33 is an integer. To be more precise, the time when the electric-signal level becomes lower than or equal to Vth is usually a rational number including a fractional part, and T33 is the smallest integer that is larger than the rational number. The electric-signal level is higher than Vth at time T33−1, and is lower than or equal to Vth at time T33. The time T33 is recorded in the storage device (digital memory) 405 shown in FIG. 8. Furthermore, since the value of the counter 701 is "2" until time T33, the electric-signal level of the photoreceptor element 401 is recorded in the analog memory 703-2 at time t=T32+1, T32+2, T32+3, . . . , and T33. At time T33, the value of the counter 701 is incremented to "3".

Since the analog memory 703-2 is overwritten each time until time T33, the value written last, i.e., the electric-signal level (V33) of the photoreceptor element at time T33, is held therein.

The electric-signal level (V33) recorded in the analog memory 703-2 and the time (T33) recorded in the storage device (digital memory) 405 are output to the calculation unit 411. The calculation unit 411 calculates a value (Vinit−V33)/(T33−T32), which is in accordance with the amount of optical energy received by the photoreceptor element 401 per unit time, and sets a pixel value of the corresponding pixel based on the result of calculation. The pixel value is fed to the image output unit 412 to display a corresponding image.

The value (Vinit−V33)/(T33−T32) represents the amount of optical energy that is incident on the sixth photoreceptor element per unit time at time T32, or to be more precise, during the period from time T32 to time T33.

Furthermore, at time T33, the sixth photoreceptor element is reset, that is, the electric-signal level of the sixth photoreceptor element is set to the initial-setting electric-signal level (Vinit). After being reset, the sixth photoreceptor element again receives optical energy, so that the electric signal thereof is attenuated (as indicated by 902-4 in FIG. 11). Similarly, times when the electric-signal level of the photoreceptor element 401 becomes lower than or equal to the threshold electric-signal level (Vth) are recorded in the storage device 405 and the electric-signal level of the photoreceptor element 401 at the times are recorded in the analog memories 703-0 to 703-(N−1) sequentially.

The values of the electric signal at the times when the electric-signal level of the photoreceptor element becomes lower than or equal to the threshold electric-signal level (Vth) are sequentially recorded in the analog memories 703-0 to 703-(N−1). This operation is continued for a certain period (until time Ty that is not shown). It is to be noted that changes represented by 902-1, 902-2, 902-3, and 902-4 in FIG. 11 are not linear because a region of an object to be imaged that becomes very bright or somewhat bright (a region where brightness changes in time) is projected on the sixth photoreceptor element.

Now, the difference between the second embodiment and the third embodiment will be explained. It is assumed herein that the rate of operation clocks (represented by integers such as 0, 1, 2, . . . in the above description) is not so fast compared with the rate of attenuation of the electric signal of a photoreceptor element. If imaging is carried out under the same conditions, in the imaging apparatus according to the second embodiment, values (Vinit−Vth)/T31, (Vinit−Vth)/(T32−T31), and (Vinit−Vth)/(T33−T32) are calculated for the region associated with the sixth photoreceptor element, and the values are used as values of the corresponding pixel data at times 0, T31, and T32.

Actually, however, the values do not precisely represent the rate of attenuation of the electric signal shown in FIG. 11. This is because although times when the electric-signal level becomes lower than or equal to Vth are usually rational numbers including fractional parts, only the smallest integers (T31, T32, and T33) that are larger than the rational numbers are determined. In contrast, according to the third embodiment, although the operation clocks are represented by integers as in the second embodiment, the electric signal levels (V31, V32, and V33) at times T31, T32, and T33 are used instead of Vth, so that the rate of attenuation of the electric signal shown in FIG. 11 is represented precisely. Thus, as compared with the second embodiment, the third embodiment allows the amount of optical energy received per unit time to be calculated even more precisely. Accordingly, precise pixel data can be obtained by imaging.

In FIG. 11, N analog memories 703-0 to 703-(N−1) are provided in total. Since N must be larger than the number of times of the setting and attenuation of a photoreceptor element, repeated until time Ty, it is desired that N (the total number of analog memories) be a sufficiently large value.

Furthermore, after the time Ty, the time data T31, T32, T33, . . . are read from the storage device (digital memory) 405, and the electric-signal-level data V31, V32, V33, . . . are read from the analog memories 703-0 to 703-(N−1). The calculation unit 411 calculates values (Vinit−V31)/T31, (Vinit−V32)/(T32−T31), (Vinit−V33)/(T33−T32), and so forth, and sets the values to corresponding pixel data at times 0, T31, T32, and so forth so that a corresponding image will be output.

The calculation need not be executed at high speed, because the calculation can be executed after imaging is finished. This means that data may be output at a low rate from the storage device 405 and the analog memories 703-0 to 703-(N−1) to the calculation unit 411.

As described above, according to the third embodiment, the value of the electric signal at a time when the electric-signal level of the photoreceptor element 401 becomes lower than or equal to the threshold electric-signal level (Vth) can be recorded precisely, and the amount of energy received by the photoreceptor element 401 per unit time is calculated based on the value recorded. Accordingly, a pixel value associated with each photoreceptor element can be calculated more precisely.

In the third embodiment, the analog memories 703-0 to 703-(N−1) are used as memories for holding the electric signal levels of the photoreceptor element 401. Alternatively, an A/D converter for converting the electric signal levels of the photoreceptor element 401 into digital values may be provided, storing the digital values in a digital memory.

The imaging apparatuses according to the embodiments of the present invention have been described above. In the embodiments, elements and circuits in each of the signal processing circuits described with reference to FIGS. 1A and 1B, FIGS. 5A and 5B, and FIG. 8 need not be localized to a single region for each pixel. For example, each of the storage devices in the figures may be implemented as a storage device that collectively stores data for all the pixels of the imaging apparatus. For example, when the components are implemented by semiconductor chips, the arrangement may be such that the photoreceptor unit is implemented by a single chip and the storage device is implemented by another single chip. Furthermore, the elements and circuits shown in the figures constitute logical combinations, and the components need not necessarily be disposed within the same case.

Furthermore, in the imaging apparatuses according to the second embodiment and the third embodiment, a single measurement is completed in a short time and a plurality of times of measurements is allowed for a photoreceptor element on which a bright region is projected. As for a photoreceptor element on which a dark region is projected, a single measurement is carried out over a relatively long time, and a relatively small number of measurements is carried out. Thus, a notion of imaging time, imaging interval, or frame that applies to the entire screen does not exist. The imaging interval differs from pixel to pixel, and only a notion of "imaging interval for an individual pixel" exists.

As is understood from the above description, the present invention generally covers any imaging apparatus in which at least one of the following two features are embodied:

1) Vth that serves as a reference for comparison by a comparator is variable.

2) A photoreceptor element on which a bright region is projected carries out imaging a plurality of times at a shorter interval compared with a photoreceptor element on which a dark region is projected.

Although the present invention has been described in the context of specific embodiments, it is to be understood that modifications of and alternatives to the embodiments can be made by those skilled in the art without departing from the spirit of the present invention. That is, the present invention has been disclosed by way of examples, and the disclosure should not be construed as limiting. The gist of the present invention should be determined by the appended claims.

The entire disclosure of Japanese Patent Application No. 2002-206380 filed on Jul. 18, 2002, including specification, claims, drawings, and abstract, is incorporated herein by reference in its entirety.

What is claimed is:

1. An imaging apparatus, comprising:
  a photoreceptor element having an output line, the photoreceptor element sending an electric-signal level to the output line in accordance with an intensity of light received by the photoreceptor element, the electric-signal level attenuating from an initial electric-signal level;
  a comparator coupled with the output line of the photoreceptor element, the comparator comparing the electric-signal level from the output line with a threshold electric-signal level, and sending an output signal when the electric-signal level is lower than the threshold electric-signal level; and
  a storage unit coupled with the comparator, the storage unit receiving a clock signal and recording a first time period for generating the output signal in the comparator;
  wherein the threshold electric-signal level monotonically increases from an initial threshold electric-signal level to a final threshold electric-signal level when the electric signal level attenuates, the initial threshold electric-signal level being lower than the electric-signal level and the final threshold electric-signal level approaching the initial electric-signal level.

2. An imaging apparatus according to claim 1, wherein the photoreceptor element is set to an initial-setting electric-signal level by an initialize signal and the electric-signal level on the output line is lowered in accordance with the intensity of light received, wherein the comparator outputs the output signal when the electric-signal level on the output line is lower than or equal to the threshold electric-signal level.

3. An imaging apparatus according to claim 1, further comprising a calculation unit coupled with the storage unit, wherein the calculation unit calculates an optical energy value received by the photoreceptor element per unit time and calculates a pixel value based on the optical energy value.

4. An imaging apparatus according to claim 3, wherein the storage unit records a second time period corresponding to changing of the electric-signal level from an initial-setting electric-signal level to the threshold electric-signal level, and sends the second time period to the calculation unit.

5. An image apparatus according to claim 4, wherein the optical energy value per unit time is calculated using a formula $(Vinit-Vth(t))/Tn$, where Vinit denotes the initial-setting electric-signal level, $Vth(t)$ denotes the threshold electric-signal level, and Tn denotes the second time period.

6. An imaging apparatus according to claim 1, wherein the comparator compares an amplified electric-signal level of the electric-signal level on the output line with the threshold electric-signal level.

* * * * *